United States Patent
Rekimoto et al.

(10) Patent No.: US 9,361,316 B2
(45) Date of Patent: Jun. 7, 2016

(54) INFORMATION PROCESSING APPARATUS AND PHRASE OUTPUT METHOD FOR DETERMINING PHRASES BASED ON AN IMAGE

(75) Inventors: Junichi Rekimoto, Kanagawa (JP); Tatsushi Nashida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 545 days.

(21) Appl. No.: 13/551,908

(22) Filed: Jul. 18, 2012

(65) Prior Publication Data
US 2013/0027535 A1 Jan. 31, 2013

(30) Foreign Application Priority Data

Jul. 26, 2011 (JP) .................................. 2011-162713

(51) Int. Cl.
*H04N 7/18* (2006.01)
*G06F 17/30* (2006.01)

(52) U.S. Cl.
CPC .... *G06F 17/30247* (2013.01); *G06F 17/30427* (2013.01); *G06F 17/30569* (2013.01); *H04N 7/18* (2013.01)

(58) Field of Classification Search
CPC ..... A47D 44/00; A47D 44/005; G09B 19/10; G09B 19/0023; G06G 5/409; H04N 5/44504; G06F 17/30247; G06F 17/30427; G06F 17/30569; G06F 17/30595
USPC ............... 348/589, 600, 333.02, 77; 707/621, 707/748, 749; 434/94, 98–100; 345/629, 345/636; 704/270, 272, 276; 715/230, 254; 463/31
See application file for complete search history.

(56) References Cited

U.S. PATENT DOCUMENTS

| | | | |
|---|---|---|---|
| 5,111,410 A * | 5/1992 | Nakayama et al. | 434/258 |
| 6,571,003 B1 * | 5/2003 | Hillebrand et al. | 382/118 |
| 6,636,249 B1 | 10/2003 | Rekimoto | |
| 6,718,063 B1 * | 4/2004 | Lennon et al. | 382/224 |
| 7,273,427 B2 * | 9/2007 | Inoue et al. | 473/407 |
| 7,328,119 B1 * | 2/2008 | Pryor et al. | 702/127 |
| 7,346,543 B1 * | 3/2008 | Edmark | 705/27.2 |
| 7,685,524 B2 | 3/2010 | Rekimoto | |
| 7,716,606 B2 | 5/2010 | Rekimoto | |
| 7,883,430 B2 * | 2/2011 | Thomas et al. | 473/307 |
| 8,094,012 B1 * | 1/2012 | Tran et al. | 340/539.13 |
| 8,670,979 B2 * | 3/2014 | Gruber et al. | 704/9 |
| 2002/0069070 A1 * | 6/2002 | Boys et al. | 704/275 |
| 2002/0143729 A1 * | 10/2002 | Fostick | 707/1 |
| 2004/0039592 A1 * | 2/2004 | Shima | 705/1 |

(Continued)

FOREIGN PATENT DOCUMENTS

JP 2010-067275 A 3/2010

*Primary Examiner* — Michael Lee
(74) *Attorney, Agent, or Firm* — Chip Law Group

(57) ABSTRACT

In one aspect, an information processing system for determining complimentary phrases to present to a recipient is provided. The information processing system may receive an input image depicting a subject. A difference in appearance between the subject depicted in the input image and a model subject may be determined. One or more phrases (e.g., complimentary phrases) may be selected from a plurality of categorized phrase candidates based on the identified difference in appearance between the subject and the model subject. The difference in appearance may be determined by comparing selected features (e.g., skin, hair, eyes) of the subject with one or more predetermined features of the model subject. The model subject may be the same or different than the subject depicted in the input image.

22 Claims, 20 Drawing Sheets

(56) References Cited

U.S. PATENT DOCUMENTS

| | | | |
|---|---|---|---|
| 2006/0085274 A1* | 4/2006 | Sottery et al. | 705/26 |
| 2008/0294424 A1* | 11/2008 | Naito | G06F 9/4448 704/8 |
| 2009/0196496 A1* | 8/2009 | Kalla et al. | 382/165 |
| 2010/0111370 A1* | 5/2010 | Black et al. | 382/111 |
| 2010/0192176 A1* | 7/2010 | Beppu et al. | 725/34 |
| 2010/0223048 A1* | 9/2010 | Lauder | 704/4 |
| 2010/0331041 A1* | 12/2010 | Liao et al. | 455/556.1 |
| 2011/0289426 A1* | 11/2011 | Sonstegard et al. | 715/745 |
| 2012/0052946 A1* | 3/2012 | Yun | 463/32 |
| 2012/0137254 A1* | 5/2012 | Cunningham et al. | 715/835 |

* cited by examiner

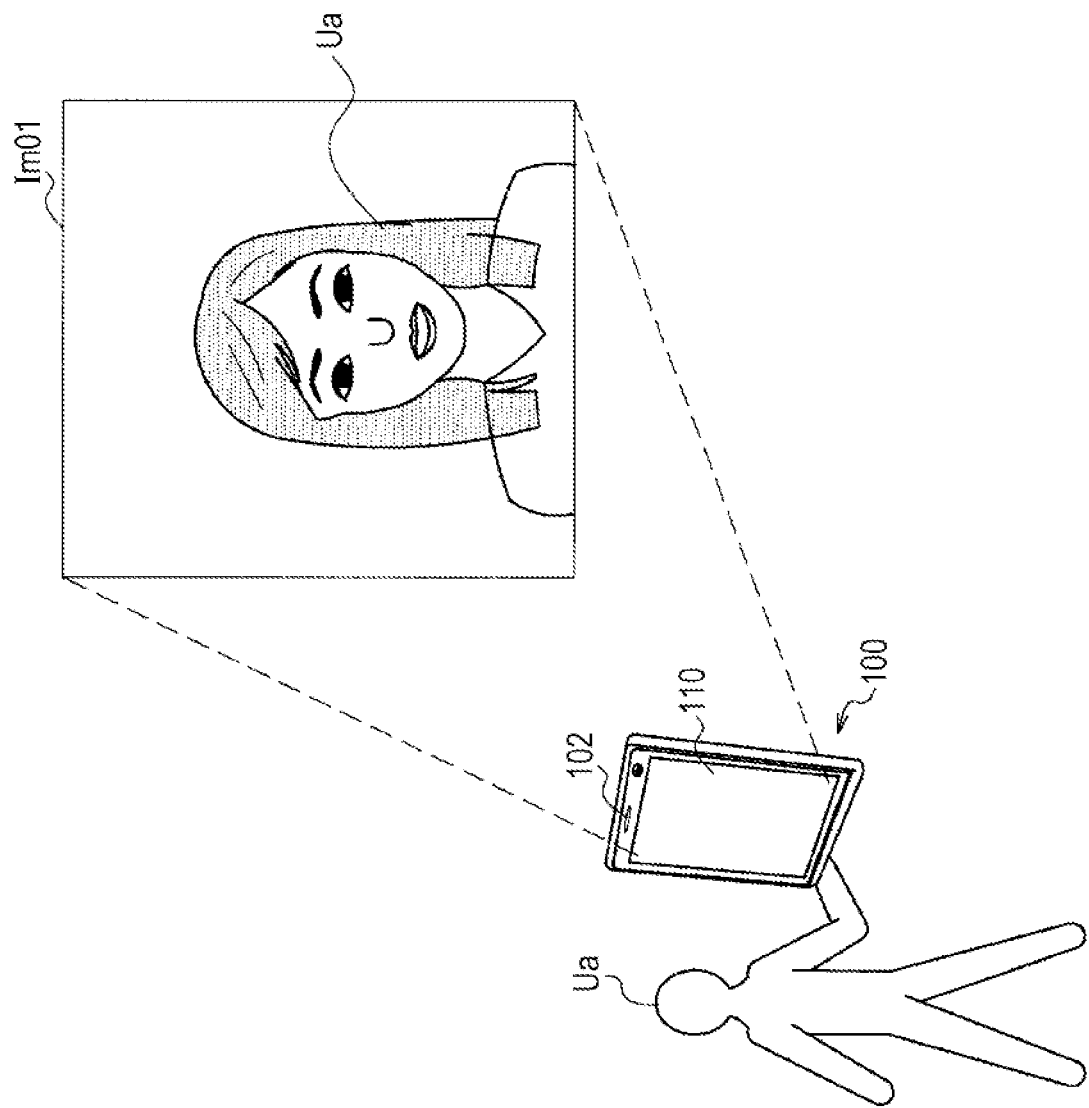

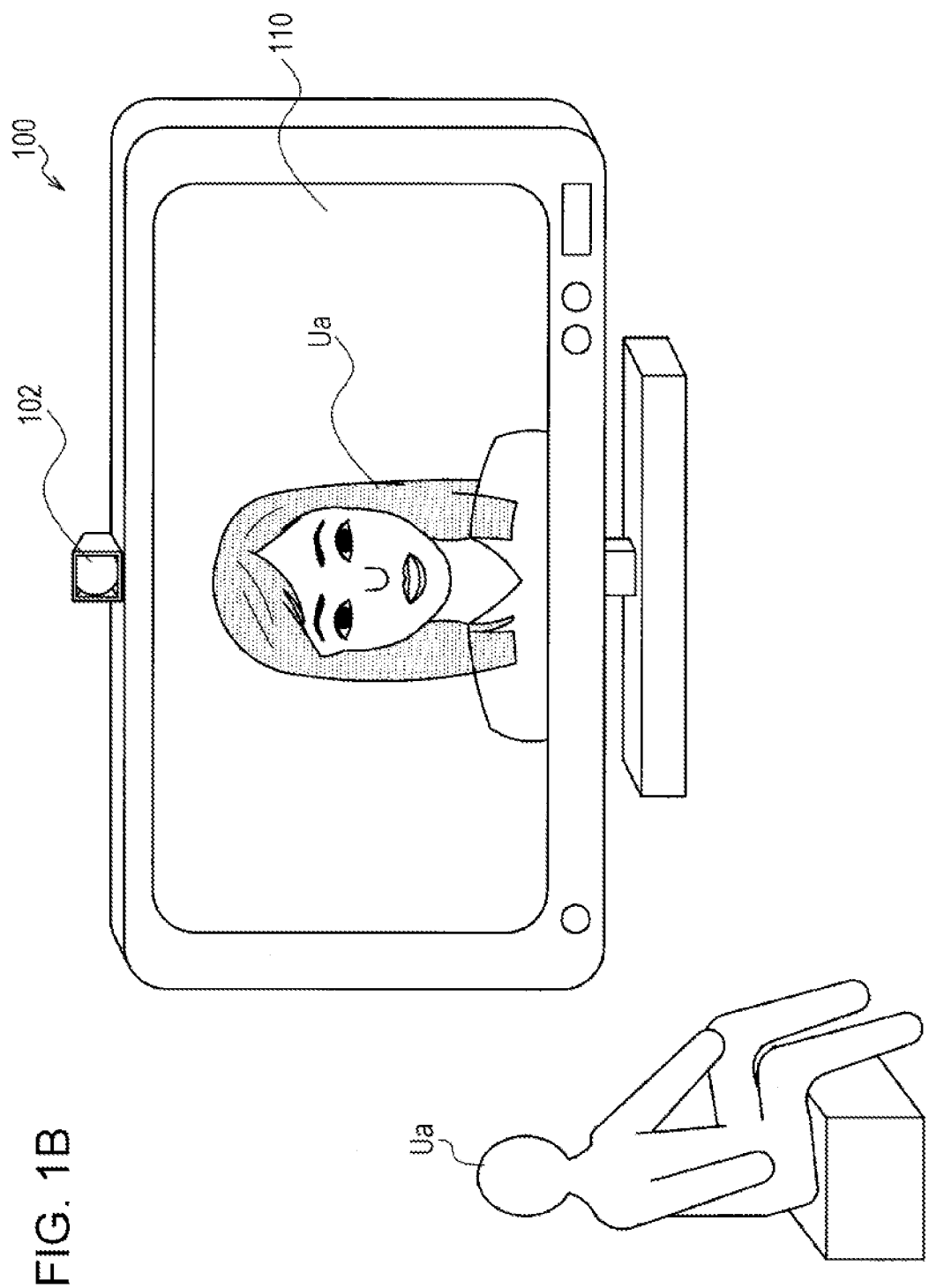

FIG. 7

| PHRASE ID | CATEGORY | | | PHRASE |
| --- | --- | --- | --- | --- |
| | SEX | FEATURE | SCORE | |
| ... | ... | ... | ... | ... |
| Ph011 | MALE | PHYSIQUE | — | You're looking fit and trim |
| Ph021 | FEMALE | PHYSIQUE | — | You have such a healthy figure |
| ... | ... | ... | ... | ... |
| Ph041 | FEMALE | SKIN | — | You have very clear skin |
| Ph051 | — | SMILE | Mid | You have a lovely smile |
| Ph052 | — | SMILE | High | Your smile makes everyone happy |
| Ph061 | FEMALE | EYES | — | You have big beautiful eyes |
| ... | ... | ... | ... | ... |
| Ph111 | — | HAIRSTYLE | — | Your new hairstyle looks great! |
| Ph112 | — | HAIRSTYLE | — | That hairstyle looks good on you |
| Ph113 | — | HAIRSTYLE | — | I like that hairstyle! |
| ... | ... | ... | ... | ... |

FIG. 8

| PERSONAL ID | OUTPUT DATE AND TIME | PHRASE ID | PHRASE CONTENT |
|---|---|---|---|
| ... | ... | ... | ... |
| Ua | 6/30/2011 16:12 | Ph041 | You have very clear skin |
| Ua | 6/30/2011 16:12 | Ph111 | Your new hairstyle looks great! |

172

INFORMATION PROCESSING APPARATUS AND PHRASE OUTPUT METHOD FOR DETERMINING PHRASES BASED ON AN IMAGE

CROSS-REFERENCE TO RELATED APPLICATIONS

The present application is based upon and claims the benefit of priority under 35 U.S.C. §119 of Japanese Priority Patent Application JP 2011-62713 filed in the Japanese Patent Office on Jul. 26, 2011, the entire contents of which are hereby incorporated by reference.

BACKGROUND

The present disclosure relates to an information processing apparatus, a phrase output method, and a program.

It is generally agreed that complimenting other people is effective for building good interpersonal relationships. Also, motivation in one's daily life and work is increased as a result of receiving positive feedback from family, friends, superiors, and colleagues. However, arbitrary positive words are not in and of themselves complimentary. If words are poorly chosen, there is a possibility of hurting someone's feelings instead, even if the intention was to provide a compliment. Conversely, if words are poorly chosen, there is a possibility of one's words exerting little to no effect on another person, even if the intention was to insult.

In the related art, there has been proposed technology that dynamically selects information that is beneficial for the user on the basis of recognition of real-world conditions, and presents the selected information to the user (see Japanese Unexamined Patent Application Publication No. 2010-67275, for example).

SUMMARY

However, technology that selects effective words for communication with other people on the basis of recognition of real-world conditions has not been developed before now. It is inferred that, if words are suitably chosen, it may be possible to elicit positive feelings in the user, even in cases where a computer rather than another person compliments the user, for example. Also, a computer may be beneficial in providing assistance with selecting words to be used for communication with other people.

Consequently, it is desirable to provide a system able to dynamically select effective words for communication with other people on the basis of recognition of real-world conditions.

According to the present disclosure, there is provided an information processing apparatus including an image acquisition unit configured to acquire an input image, a selector configured to select phrase candidates to present to a person depicted in the input image, the phrase candidates being selected from a database that stores positive phrases to present to a person, and a phrase output unit configured to output at least one phrase from among the phrase candidates selected by the selector.

Also, according to the present disclosure, there is provided a phrase output method conducted by a controller in an information processing apparatus, the method including acquiring an input image, selecting phrase candidates to present to a person depicted in the input image, the phrase candidates being selected from a database that stores positive phrases to present to a person, and outputting at least one phrase from among the selected phrase candidates.

Also, according to the present disclosure, there is provided a program causing a computer that controls an information processing apparatus to function as an image acquisition unit configured to acquire an input image, a selector configured to select phrase candidates to present to a person depicted in the input image, the phrase candidates being selected from a database that stores positive phrases to present to a person, and a phrase output unit configured to output at least one phrase from among the phrase candidates selected by the selector.

According to the present disclosure, there is provided a system able to dynamically select effective words for communication with other people on the basis of recognition of real-world conditions.

In a particular aspect, an information processing system including one or more processors is provided. The one or more processors of the information processing system may be configured to receive an input image captured by an image sensor. The one or more processor may be further configured to analyze the input image to identify a difference in appearance between a subject depicted in the input image and a model subject, and select one or more phrases from a plurality of phrase candidates based on the identified difference in appearance between the subject and a model subject. The one or more processors may also be configured to output, to an output device, at least one of the one or more selected phrases for presentment to a recipient.

In another aspect, the one or more processors of the information processing system may be further configured to identify the difference in appearance between the subject depicted in the input image and the model subject by comparing one or more features of the subject extracted from the analysis of the input image with one or more predetermined features of the model subject.

In yet another aspect, the one or more processors of the information processing system may be further configured to select the one or more phrases from the plurality of phrase candidates based on a determined category of the identified difference in appearance between the subject depicted in the input image and the model subject.

In one aspect, the one or more processors of the information processing system may be further configured to select the model subject based on a prior image or images of the subject depicted in the input image.

In another aspect, the one or more processors of the information processing system may be further configured to select the model subject based on an image or images of one or more average subjects, where the one or more average subjects may be different from the subject depicted in the input image.

In yet another aspect, the one or more processors of the information processing system may be further configured to display the input image depicting the subject to a user on a display device, determine a feature of the subject selected by the user, and display, on the display device, one or more phrase candidates from the plurality of phrase candidates for further selection by the user. In addition, one or more of the displayed phrase candidates may be selected by the user for presentment to the recipient based on the selected feature of the subject.

In another aspect, the one or more processors of the information processing system may be further configured to exclude a given phrase from the one or more phrases selected from the plurality of phrase candidates, where the given phrase may be excluded based upon a determination that the given phrase was previously or recently output to the output device for presentment to the recipient.

In one aspect, the one or more processors of the information processing system may be further configured to control a timing of the output of the at least one of the one or more selected phrases to the output device based on a condition of the subject determined from the analysis of the input image. In a further aspect, the condition of the subject determined from the analysis of the input image may include a specific expression, posture, or gesture of the subject depicted in the input image.

In yet another aspect, the one or more processors may be further configured to output the at least one of the one or more selected phrases to the output device based on a determined location of the subject depicted in the input image. In another aspect, the one or more processors may also be configured to output the at least one of the one or more selected phrases to the output device using a particular dialect associated with the determined location.

In one aspect, the at least one of the one or more selected phrases output to the output device may be a complimentary or positive phrase that is selected from the plurality of phrase candidates based on the identified difference in appearance between the subject depicted in the input image and the model subject.

In another aspect, the one or more processors may be further configured to determine a degree of the identified difference in appearance between the subject and a model subject. In addition, the one or more processors may be further configured to select the one or more phrases from the plurality of phrase candidates when the determined degree of the identified difference in appearance between the subject and a model subject exceeds a predetermined threshold.

In yet another aspect, the model subject may be selected by the one or more processors of the information processing system may from one of a plurality of selectable model subjects based on input received from a user.

In one embodiment, the one or more processors of the information processing system may be further configured to output audio of the at least one of the one or more selected phrases to the output device for presentment to the recipient. In another embodiment, the output device may be a directional speaker for transmitting the audio of the at least one of the one or more selected phrases in a determined direction of the recipient. The one or more processors of the information processing system may also be configured to identify the determined direction of the recipient from the analysis of the input image, and output the audio as directional audio to the directional speaker based on the determined direction.

In yet another embodiment, the output device may be provides as part of an information processing device associated with the recipient.

A computer-implemented method executed by a processor is provided. The method may include receiving an input image captured by an image sensor, and analyzing, with the processor, the input image to identify a difference in appearance between a subject depicted in the input image and a model subject. The method may further include selecting one or more phrases from a plurality of phrase candidates based on the identified difference in appearance between the subject and a model subject and, outputting, to an output device, at least one of the one or more selected phrases for presentment to a recipient.

A non-transitory storage unit on which computer-readable instructions of a program are stored is provided. The instructions, when executed by one or more processors, may cause the one or more processors to receive an input image captured by an image sensor and analyze the input image to identify a difference in appearance between a subject depicted in the input image and a model subject. The instructions stored on the storage unit may further cause the one or more processors to select one or more phrases from a plurality of phrase candidates based on the identified difference in appearance between the subject and a model subject and, output, to an output device, at least one of the one or more selected phrases for presentment to a recipient.

BRIEF DESCRIPTION OF THE DRAWINGS

FIG. 1A is a first diagram illustrating an overview of an information processing apparatus according to a first embodiment;

FIG. 1B is a second diagram illustrating an overview of an information processing apparatus according to a first embodiment;

FIG. 8 is a diagram explaining an exemplary history database structure;

DETAILED DESCRIPTION OF EMBODIMENTS

Hereinafter, preferred embodiments of the present disclosure will be described in detail and with reference to the attached drawings. Note that in the specification and drawings, like reference signs are given to components with substantially like functional configurations, and duplicate description of such components will be reduced or omitted.

The description will proceed as follows.
1. Overview
2. Details of first embodiment
2-1. Hardware configuration
2-2. Functional configuration
2-3. Process flow
2-4. Summary of first embodiment
2-5. Modifications
3. Details of second embodiment
3-1. Hardware configuration
3-2. Functional configuration
3-3. Process flow
3-4. Summary of second embodiment
3-5. Modifications
4. Conclusion

1. OVERVIEW

This section gives an overview of two embodiments of the technology disclosed in this specification.

FIGS. 1A and 1B illustrate an overview of an information processing apparatus 100 according to a first embodiment. FIG. 1A illustrates an information processing apparatus 100 possessed by a user Ua. The information processing apparatus 100 is provided with an imaging unit 102 configured as a front-facing camera, and a display 110. When the user Ua points the lens of the imaging unit 102 at him- or herself, an image depicting the user Ua is captured by the imaging unit 102, and the captured image is displayed by the display 110. The image Im01 illustrated in FIG. 1A is an example of an image captured by the information processing apparatus 100. The image Im01 depicts the user Ua's face. The information processing apparatus 100 acquires such a captured image as an input image and recognizes the conditions of the user Ua. The information processing apparatus 100 then dynamically selects an effective phrase to give to the user Ua on the basis of the recognized conditions. In a first embodiment later described in detail, the phrase that is dynamically selected by the information processing apparatus 100 is a phrase for complimenting the user Ua.

In FIG. 1A, a mobile device is illustrated as an example of the information processing apparatus 100. However, the information processing apparatus 100 is not limited to such an example. The information processing apparatus 100 may also be a personal computer (PC), personal digital assistant (PDA), smartphone, game console, media player, or digital appliance, for example. Also, as illustrated in FIG. 1B, the information processing apparatus 100 may be an apparatus such as a dresser and mirror that includes an imaging unit 102 and a display 110.

Figure 2:
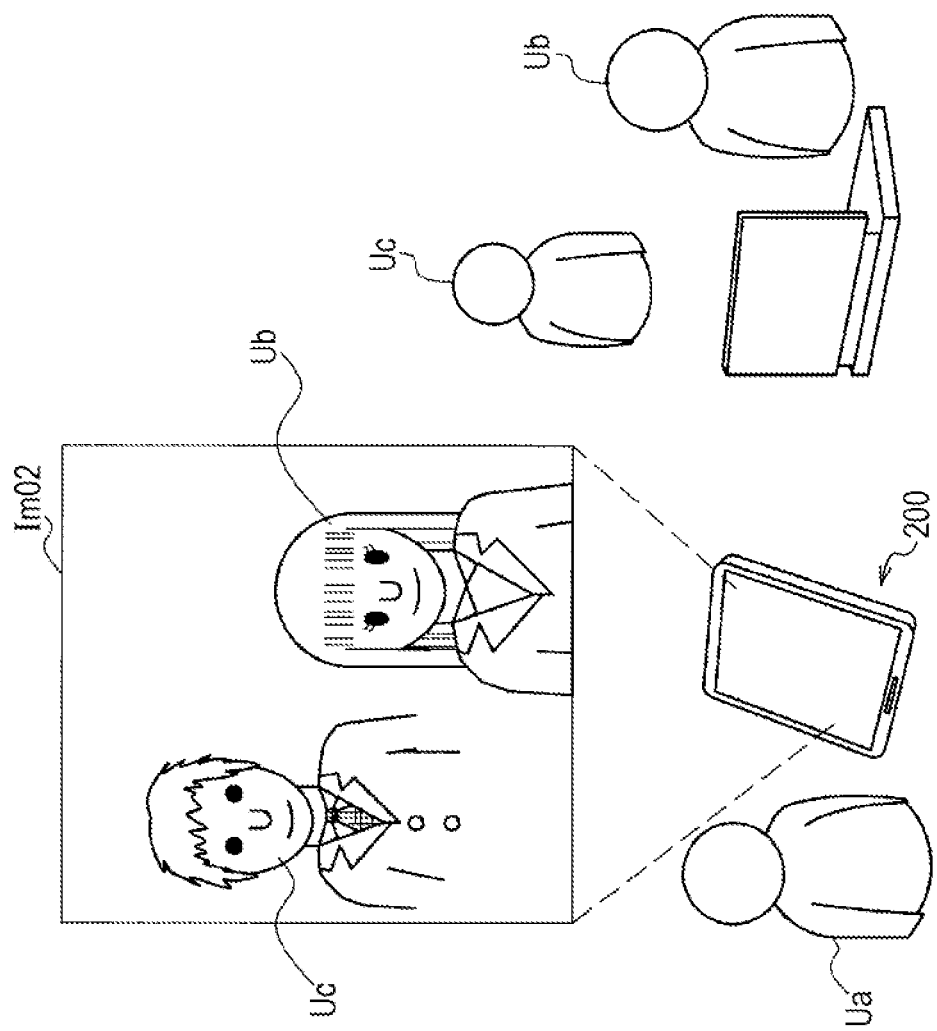
FIG. 2 is a diagram illustrating an overview of an information processing apparatus according to a second embodiment.

FIG. 2 illustrates an overview of an information processing apparatus 200 according to a second embodiment. FIG. 2 illustrates a user Ua, as well as persons Ub and Uc. The persons Ub and Uc are people who communicate with the user Ua. The user Ua possesses an information processing apparatus 200. The information processing apparatus 200 is provided with a rear-facing camera (not illustrated). When the user Ua points the lens of the rear-facing camera at the persons Ub and Uc, an image depicting the persons Ub and Uc is captured by the rear-facing camera. The image Im02 illustrated in FIG. 2 is an example of an image captured by the information processing apparatus 200. The information processing apparatus 200 acquires such a captured image as an input image and recognizes the conditions of the persons Ub and Uc who communicate with the user Ua. The information processing apparatus 200 then dynamically selects effective phrases to give to the persons Ub and Uc, respectively, on the basis of the recognized conditions. In a second embodiment later described in detail, the phrases that are dynamically selected by the information processing apparatus 200 are phrases for complimenting the respective persons. However, in a modification of the second embodiment, phrases that express a negative opinion towards respective persons instead of complimenting them may also be selected.

Although FIG. 2 illustrates an example in which there are two persons who communicate with the user Ua, the number of persons who communicate with the user Ua may be one, or three or more. Similarly to the information processing apparatus 100 discussed earlier, the information processing apparatus 200 may also be a PC, PDA, smartphone, game console, media player, or digital appliance. Also, the information processing apparatus 200 may be realized using special equipment such as a head-mounted display (HMD) or glasses with on-board imaging functions.

2. DETAILS OF FIRST EMBODIMENT

Next, an information processing apparatus 100 according to a first embodiment and illustrated in FIGS. 1A and 1B will be described in detail.

[2-1. Hardware Configuration]

Figure 3:
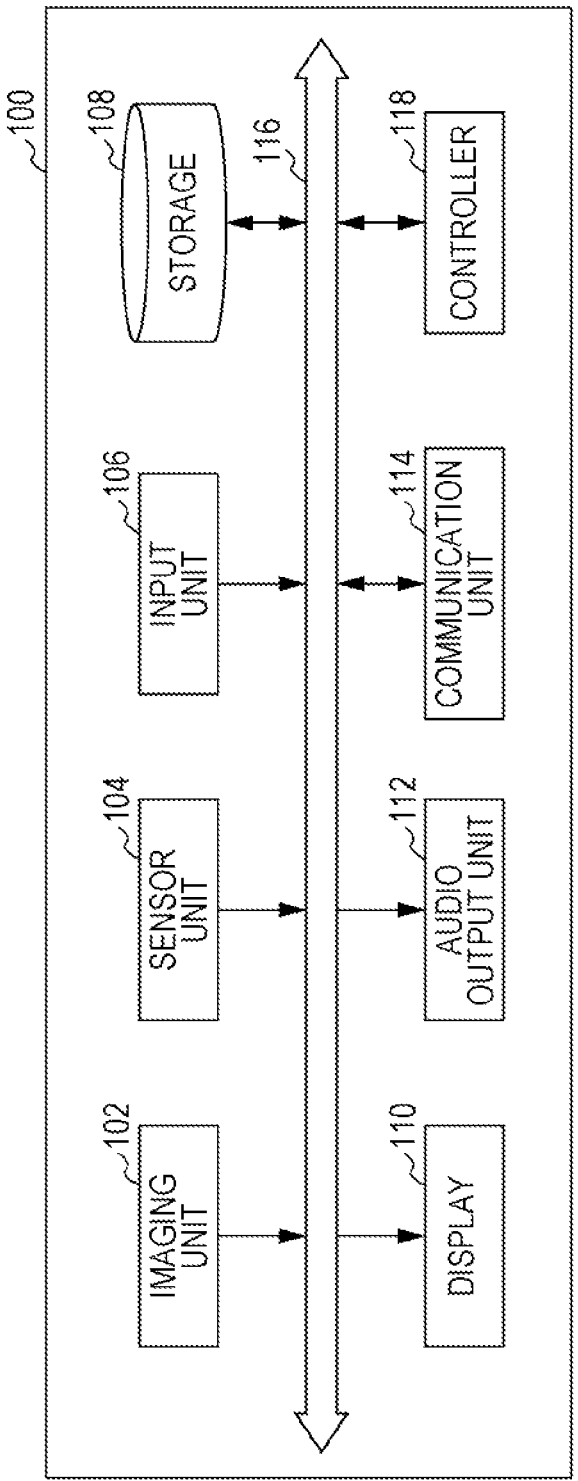
FIG. 3 is a block diagram illustrating an exemplary hardware configuration of an information processing apparatus.

FIG. 3 is a block diagram illustrating an exemplary hardware configuration of an information processing apparatus 100 according to the present embodiment. As illustrated in FIG. 3, the information processing apparatus 100 is provided with an imaging unit 102, a sensor unit 104, an input unit 106, storage 108, a display 110, an audio output unit 112, a communication unit 114, a bus 116, and a controller 118.

(1) Imaging Unit

The imaging unit 102 is a camera module that captures images. The imaging unit 102 captures a person as a photographic subject by using an imaging element such as a charge-coupled device (CCD) or a complementary metal-oxide-semiconductor (CMOS), and generates a captured image. In the first embodiment, the imaging unit 102 is configured as a front-facing camera (a camera pointed toward the user of the information processing apparatus 100). Consequently, the subject of an image captured by the imaging unit 102 is the user of the information processing apparatus 100. However, the imaging unit 102 may also be external to the information processing apparatus 100. For example, an imaging apparatus having a wired or wireless connection with the information processing apparatus 100 may be treated as the imaging unit 102.

(2) Sensor Unit

The sensor unit 104 is a sensor module that detects the location of the information processing apparatus 100. For example, the sensor unit 104 may include a GPS sensor that receives Global Positioning System (GPS) signals to measure the latitude, longitude, and elevation of the information processing apparatus 100. The sensor unit 104 may additionally include a positioning sensor that measures the position of the information processing apparatus 100 on the basis of the strengths of wireless signals received from a wireless access point.

(3) Input Unit

The input unit 106 is an input device used by the user to operate the information processing apparatus 100 or input information into the information processing apparatus 100. The input unit 106 may, for example, include a touch sensor that detects touches made by the user on the screen of the display 110. Instead of (or in addition to) the above, the input unit 106 may also include a pointing device such as a mouse or touchpad. Furthermore, the input unit 106 may also include other types of input devices, such as a keyboard, keypad, buttons, and switches.

(4) Storage

The storage 108 is a storage medium such as semiconductor memory or a hard disk, and is configured to store programs and data used in processes conducted by the information processing apparatus 100. Data stored in the storage 108 may include captured image data generated by the imaging unit 102, model data used when analyzing images, phrase data, and history data, for example.

However, some or all of the programs and data described in this specification may also be acquired from an external data source (such as a data server, network storage, or externally-attached memory, for example) rather than being stored in the storage 108.

(5) Display

The display 110 is a display module implementing liquid crystal display (LCD), organic light-emitting diode (OLED), or cathode ray tube (CRT) technology, for example. The display 110 may be used to present the user with phrases selected by the information processing apparatus 100, for example. The display 110 may also display user interface screens provided by the information processing apparatus 100. However, the display 110 may also be external to the information processing apparatus 100 rather than a part thereof. For example, a display apparatus having a wired or wireless connection with the information processing apparatus 100 may be treated as the display 110.

(6) Audio Output Unit

The audio output unit 112 is an output module, typically including one or more speakers and an amp or other circuits. The audio output unit 112 may be used to play back phrases selected by the information processing apparatus 100 to the user as audio, for example.

(7) Communication Unit

The communication unit 114 is a communication interface that mediates communication between the information processing apparatus 100 and other apparatus. The communication unit 114 supports an arbitrary wired or wireless communication protocol, and establishes a communication connection with another apparatus.

(8) Bus

The bus 116 connects the imaging unit 102, sensor unit 104, input unit 106, storage 108, display 110, audio output unit 112, communication unit 114, and controller 118 to each other.

(9) Controller

The controller 118 corresponds to a processor such as a central processing unit (CPU) or a digital signal processor (DSP). The controller 118 causes various later-described functions of the information processing apparatus 100 to operate by executing one or more programs stored in the storage 108 or another storage medium.

[2-2. Functional Configuration]

Figure 4:
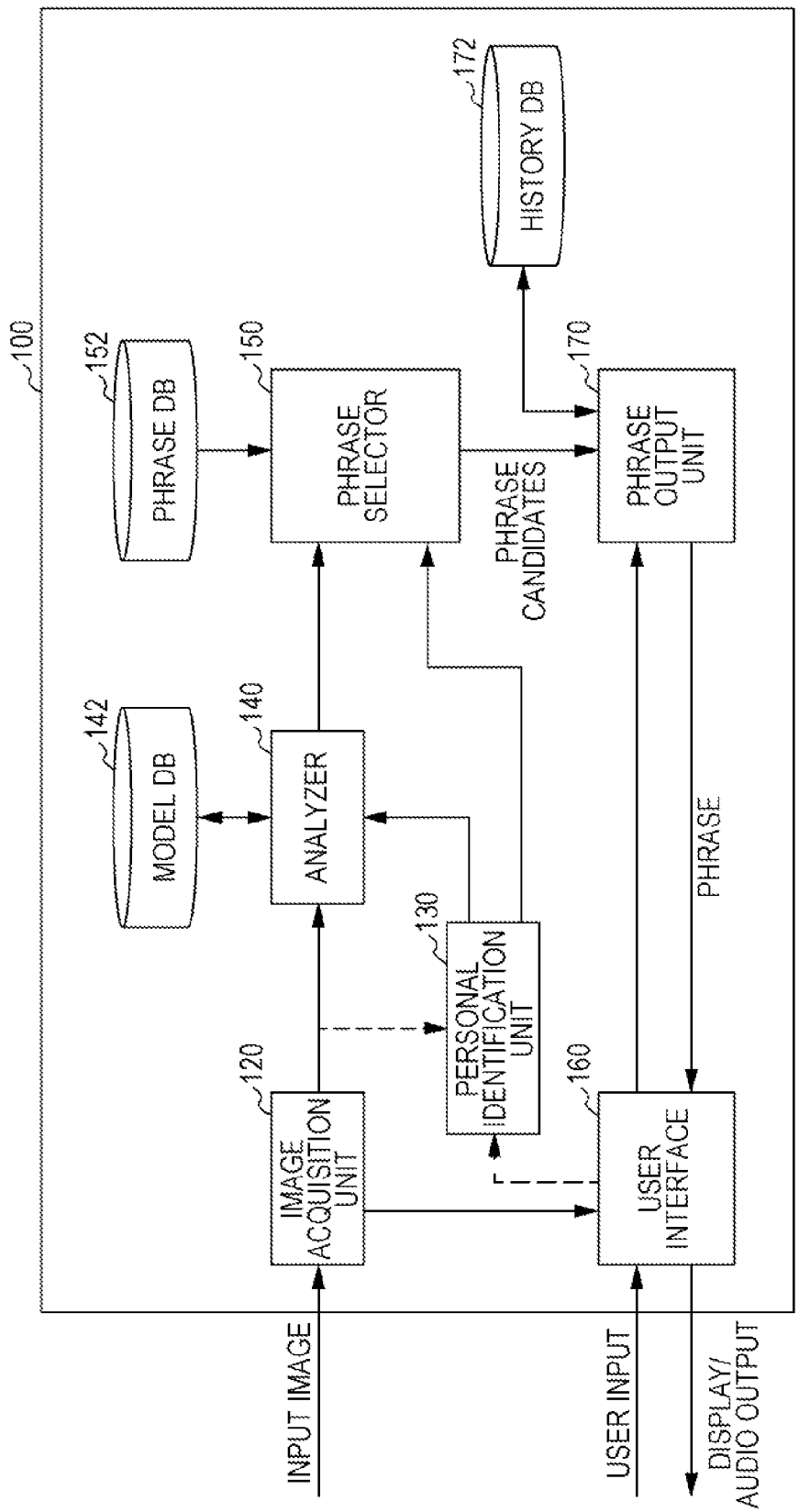
FIG. 4 is a block diagram illustrating an exemplary configuration of logical functions in an information processing apparatus according to a first embodiment.

FIG. 4 is a block diagram illustrating an exemplary configuration of logical functions realized by the storage 108 and the controller 118 of the information processing apparatus 100 illustrated in FIG. 3. As illustrated in FIG. 4, the information processing apparatus 100 includes an image acquisition unit 120, a personal identification unit 130, an analyzer 140, a model database (DB) 142, a phrase selector 150, a phrase DB 152, a user interface unit 160, a phrase output unit 170, and a history DB 172.

(1) Image Acquisition Unit

The image acquisition unit 120 acquires a captured image generated by the imaging unit 102 as an input image. As discussed earlier, in the present embodiment, the imaging unit 102 is a camera module for a front-facing camera which points toward the user of the information processing apparatus 100. Consequently, the user of the information processing apparatus 100 is depicted in an input image acquired by the imaging unit 120. The input image may be a still image, or an individual frame constituting part of a motion image. The image acquisition unit 120 outputs an acquired input image to the personal identification unit 130, the analyzer 140, and the user interface unit 160.

(2) Personal Identification Unit

The personal identification unit 130 identifies a person depicted in an input image acquired by the image acquisition unit 120. The personal identification unit 130 may identify a person depicted in an input image by using a personal identification algorithm based on established image recognition technology, for example. Alternatively, the personal identification unit 130 may identify a person depicted in an input image as being the user currently logged into the information processing apparatus 100. Also, the personal identification unit 130 may identify a person depicted in an input image by causing the user to input identification information, such as a user ID or nickname, via the user interface unit 160. The personal identification unit 130 outputs information specifying an identified person to the analyzer 140 and the phrase selector 150.

However, the personal identification process conducted by the personal identification unit 130 may also be omitted in certain applications, such as when the information processing apparatus 100 is used by only one user.

(3) Analyzer

The analyzer 140 analyzes an input image input from the image acquisition unit 120 in order to determine categories used when selecting candidates of phrases to output (hereinafter called phrase candidates) from the phrase DB 152. Herein, categories classify a plurality of phrase candidates stored in the phrase DB 152. In the present embodiment, phrase candidates stored in the phrase DB 152 are positive phrases presented to people. In other words, various positive phrases which may be used when complimenting people are stored by category in advance in the phrase DB 152. As described later in detail, the categories that classify phrase candidates in the present embodiment at least include categories corresponding to features in the appearance of a person depicted in an input image.

Consequently, the analyzer 140 analyzes an input image to specify features in the appearance of a person depicted in the input image. The analyzer 140 then determines the categories corresponding to the specified features as the categories from which to select phrase candidates. Features in a person's appearance may be parts of that person's body, such as the eyes, nose, mouth, skin, hands, or feet, for example. Additionally, features in a person's appearance may also be that person's expression, posture, hairstyle, clothing, accessories being worn, or makeup, for example.

The analyzer 140 specifies features in the appearance of a person depicted in an input image by comparing that person's appearance to an appearance model, for example. The model DB 142 illustrated in FIG. 4 stores model data expressing the appearance model compared against the appearance of a person depicted in an input image. Hereinafter, two examples of appearance models will be described.

(3-1) First Example

Figure 5:
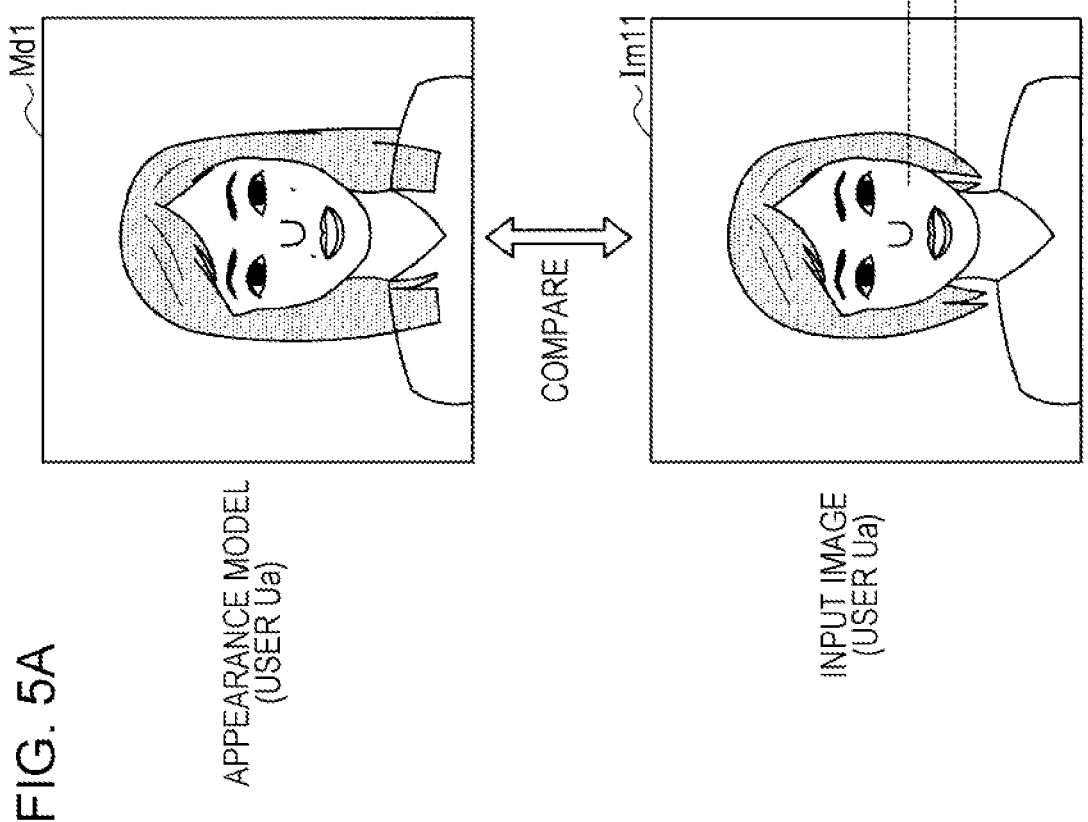
FIG. 5A is a first diagram explaining specification of features based on a first example of an appearance model.
FIG. 5B is a second diagram explaining specification of features based on a first example of an appearance model.

In the first example, the appearance model is a model of the past appearance (e.g., prior image) of a person identified by the personal identification unit 130. The upper-left part of FIG. 5A illustrates an appearance model Md1 for the first example. The appearance model Md1 is an image expressing the average appearance of the user Ua of the information processing apparatus 100, derived from, for example, a prior image or images of the past appearance of the person. An image expressing the average appearance of the user Ua may be calculated in advance from a plurality of previously-captured images (e.g., prior images) of the user Ua, for example. Meanwhile, the lower-left part of FIG. 5A illustrates an input image Im11 which may be input from the image acquisition unit 120.

The analyzer 140 compares such an appearance model Md1 to such an input image Im11, and scores individual parts of the appearance according to the degree of change in the appearance of the user Ua depicted in the input image Im11 from the appearance of the user Ua expressed by the appearance model Md1. In the example in FIG. 5A, "Hairstyle" has been given a score of 80, "Skin" a score of 50, "Physique" a score of −5, and "Smile" a score of 0. These score values may be normalized to respective maximum values of 100, for example. Also, negative values may be given as scores for categories in which not only the degree of change but also the direction of change from the average appearance is meaningful (such as becoming fatter or thinner with respect to "Physique", for example). The analyzer 140 compares the values for individual parts scored in this way to a given threshold value, and specifies parts having values that exceed the threshold value (i.e., parts with a large degree of change) as features. In the example in FIG. 5A, "Hairstyle" and "Skin" are specified as features in the most recent appearance of the user Ua.

FIG. 5B illustrates an appearance model Md1 for the first example that is similar to the example in FIG. 5A. The lower-left part of FIG. 5B illustrates an input image Im12 which may be input from the image acquisition unit 120. In the example in FIG. 5B, "Hairstyle" has been given a score of 0, "Skin" a score of 20, "Physique" a score of 40, and "Smile" a score of 75. As a result, "Physique" and "Smile" are specified as features in the most recent appearance of the user Ua.

(3-2) Second Example

Figure 6:
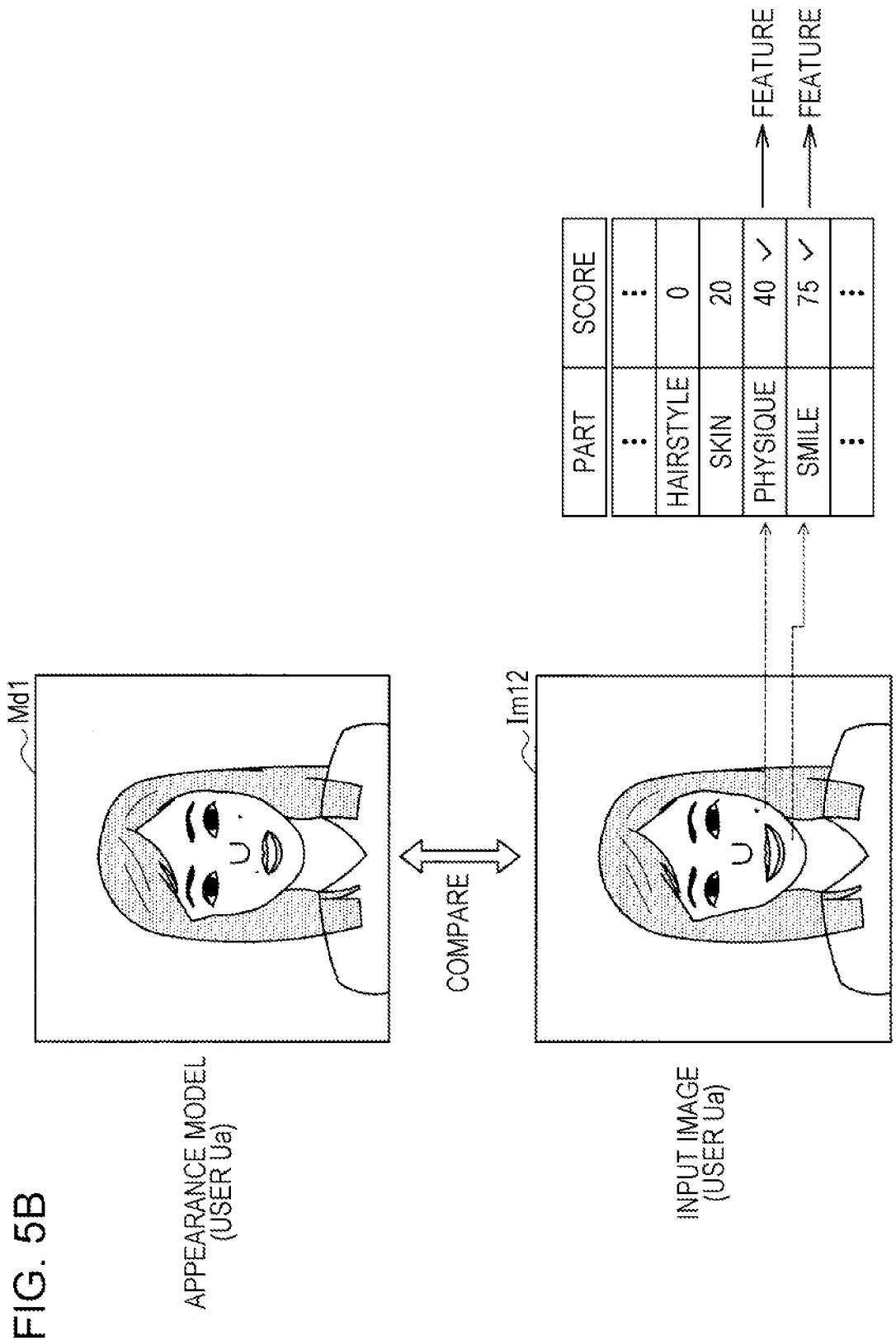
FIG. 6 is a diagram explaining specification of features based on a second example of an appearance model.

In the second example, the appearance model is a model of a standard appearance applied to multiple persons. The upper-left part of FIG. 6 illustrates an appearance model Md2 for the second example. The appearance model Md2 is calculated from a plurality of images captured in advance for a plurality of persons (or created on the basis of information such as golden ratios for the face and body), for example, and stored in the model DB 142. Different appearance models Md2 for individual sexes and age groups of persons may also be stored in the model DB 142. The lower-left part of FIG. 6 illustrates an input image Im13 which may be input from the image acquisition unit 120.

The analyzer 140 compares such an appearance model Md2 to such an input image Im13, and scores individual parts of the appearance according to the degree of difference in the appearance of the user Ua depicted in the input image Im13 from the appearance of a standard person expressed by the appearance model Md2. In the example in FIG. 6, "Skin" has been given a score of 20, "Physique" a score of −5, "Smile" a score of 10, and "Eyes" a score of 50. The analyzer 140 compares the values for individual parts scored in this way to a given threshold value, and specifies parts having values that exceed the threshold value (i.e., parts with a large degree of difference) as features. In the example in FIG. 6, "Eyes" are specified as a feature in the most recent appearance of the user Ua.

Herein, the above first example and second example are primarily described in terms of an example in which the appearance model is image data. However, rather than image data, an appearance model may also be a set of coordinates of feature points exhibited in the appearance, for example. An appearance model may also be a collection of various parameters, such as the size, luminosity, and chromaticity of individual body parts. Also, the analyzer 140 may compare a person depicted in an input image to appearance models from both the first example and the second example.

The analyzer 140 may also specify several features without comparing an input image to an appearance model. For example, the analyzer 140 may use smile recognition technology like that described in Japanese Unexamined Patent Application Publication No. 2008-311818 to score the degree of a smile by a person depicted in an input image, and specify "Smile" as a feature of a person scoring a value that exceeds a given threshold value.

The analyzer 140 may also recognize the face of a person depicted in an input image and additionally identify attributes such as that person's sex or age group on the basis of recognized facial features. A person's attributes which have been identified in this way may also be used when selecting phrase candidates from the phrase DB 152.

(4) Phrase Selector

The phrase selector 150 selects phrase candidates to present to a person depicted in an input image. Phrase candidates are selected from the phrase DB 152, which stores a plurality of positive phrases. In the present embodiment, the phrase DB 152 stores phrases in separate categories regarding a person's appearance, as discussed earlier. Additionally, the phrase selector 150 selects phrases which belong to categories corresponding to features specified by the analyzer 140 as phrase candidates.

Figure 7:
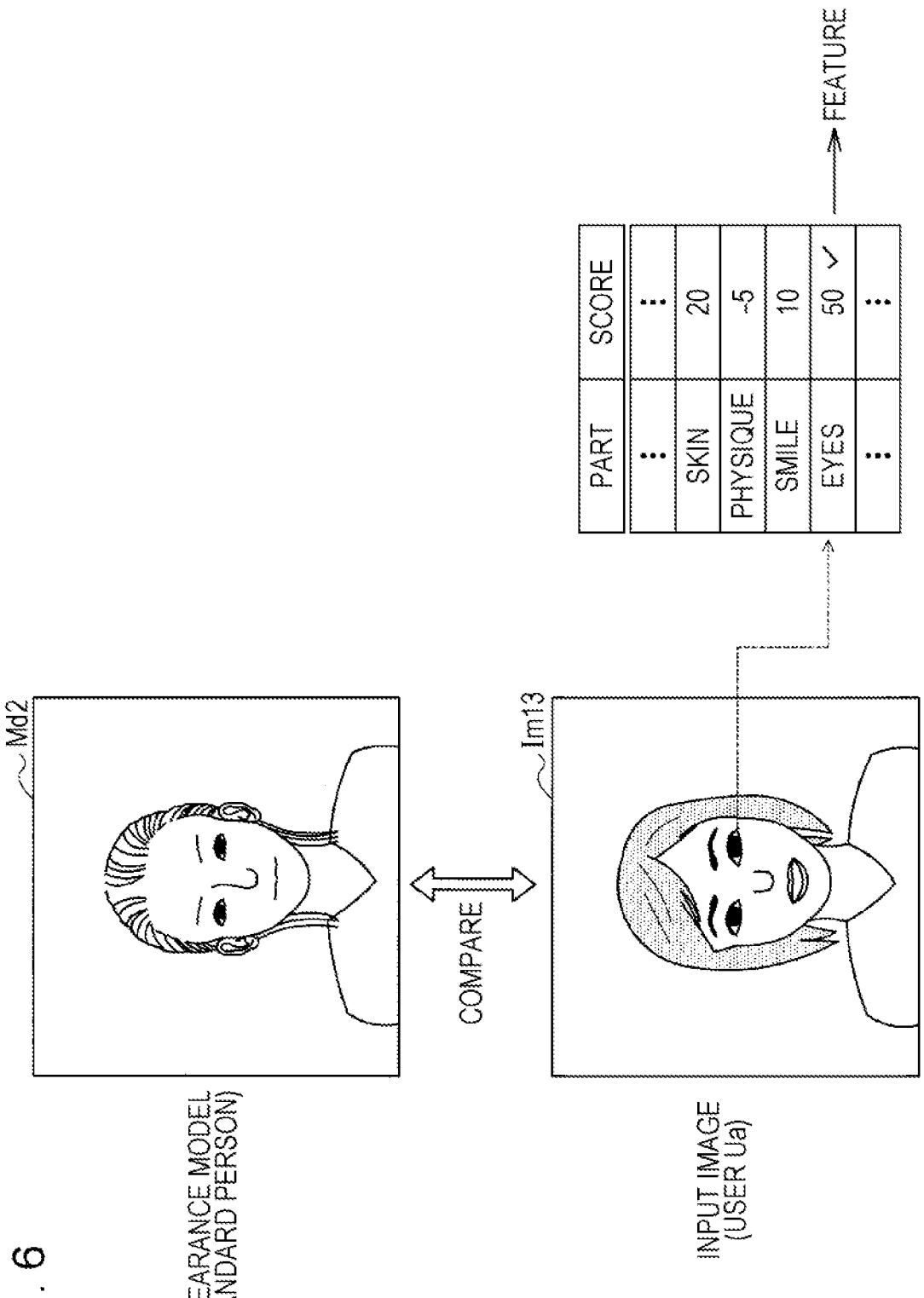
FIG. 7 is a diagram explaining an exemplary phrase database structure.

FIG. 7 is a diagram explaining an exemplary structure of the phrase DB 152. As illustrated in FIG. 7, the phrase DB 152 is a database that includes the following data fields: Phrase ID 153, Sex 154a, Feature 154b, Score 154c, and Phrase 155. The Phrase ID 153 is an identifier that uniquely identifies each phrase stored in the phrase DB 152. Phrase categories are jointly determined by Sex 154a, Feature 154b, and Score 154c. Sex 154a is a division indicating "Male", "Female", or "Unspecified". Feature 154b expresses various features in a person's appearance. Score 154c is a division regarding the strength of a score, such as "High" or "Mid". Phrase 155 is a text string expressing the content of a phrase. The phrases illustrated in FIG. 7 are positive phrases used when complimenting a person with respect to a corresponding feature.

For example, if "Hairstyle" and "Skin" are specified as features in the user's appearance, as in the example in FIG. 5A, the phrase selector 150 would extract phrases whose Feature 154b is "Hairstyle" or "Skin" from the phrase DB 152. In this case, the phrases extracted from the phrase DB 152 illustrated by way of example in FIG. 7 are the phrases Ph041, Ph111, Ph112, and Ph113. The phrase selector 150 may also filter the phrases to extract from the phrase DB 152 according to the sex of the user identified by the analyzer 140. In the case where "Physique" is specified as a feature in the user's appearance, as in the example in FIG. 5B, the phrase Ph021 may be extracted from the phrase DB 152 if the user is female. The phrase selector 150 may also filter the phrases to extract from the phrase DB 152 according to the score values computed by the analyzer 140 for phrases in which some kind of division is specified in Score 154c. In the case where "Smile" is specified as a feature in the user's appearance, as in the example in FIG. 5B, the phrase Ph052 may be extracted from the phrase DB 152 if the score for "Smile" is higher than a given threshold value.

The phrase selector 150 selects phrases extracted from the phrase DB 152 in this way as phrase candidates presented to the person depicted in the input image (in the present embodiment, the user Ua). The phrase selector 150 then outputs the selected phrase candidates to the phrase output unit 170.

(5) User Interface Unit

The user interface unit 160 uses the input unit 106, the display 110, and the audio output unit 112 illustrated in FIG. 3 to present a user interface to the user of the information processing apparatus 100. For example, the user interface unit 160 may present to the user an input screen prompting the user to input identification information for identifying the person depicted in an input image. The user interface unit 160 may also present to the user a configuration screen for setting an appearance model to be used when analyzing an input image with the analyzer 140. The user interface unit 160 may also present to the user a specification screen prompting the user to specify the user's features. Additionally, the phrase output unit 170 to be described next outputs at least one phrase via the user interface unit 160 in order to present an effective phrase for the person depicted in an input image.

(6) Phrase Output Unit

The phrase output unit 170 outputs at least one phrase via the user interface unit 160 from among phrase candidates selected by the phrase selector 150. In the present embodiment, a phrase may be output by being displayed on the display 110 or by being output as audio from the audio output unit 112, for example. A phrase may also be output to the display screen of the display 110 with the phrase superimposed over the input image. In such cases, an augmented reality (AR) application for complimenting the user may be realized. A phrase may also be spoken as audio output from the audio output unit 112. In the case where a plurality of phrase candidates have been selected by the phrase selector 150, the phrase output unit 170 may output one or more phrases determined at random from among the plurality of phrase candidates, for example. The phrase output unit 170 may also prioritize a phrase corresponding to the feature with the highest score computed by the analyzer 140.

Additionally, the phrase output unit 170 causes a history of phrases output to the same person to be stored in the history DB 172. Furthermore, the phrase output unit 170 may also output different phrases according to the history of output phrases stored in the history DB 172.

FIG. 8 is a diagram explaining an exemplary structure of the history DB 172. As illustrated in FIG. 8, the history DB 172 includes the following data fields: Personal ID, Output date and time, Phrase ID, and Phrase content. Personal ID is an identifier for identifying a person presented with a phrase. Output date and time expresses the date and time when a phrase was output. Phrase ID is an identifier for an output phrase. Phrase content is a text string expressing the content of an output phrase. Referring to the history DB 172 illustrated by way of example in FIG. 8, it is ascertained that the phrases Ph041 and Ph111 were output for the user Ua at 16:12 on Jun. 30, 2011. Consequently, in the case where subsequent phrase candidates include the phrases Ph111, Ph112, and Ph113, the phrase output unit 170 may output the phrase Ph112 or Ph113 rather than the phrase Ph111, which may thus be excluded. In so doing, the repeated output of the same phrases to the same person can be avoided, and output of fresh phrases can be sustained.

Figure 9:
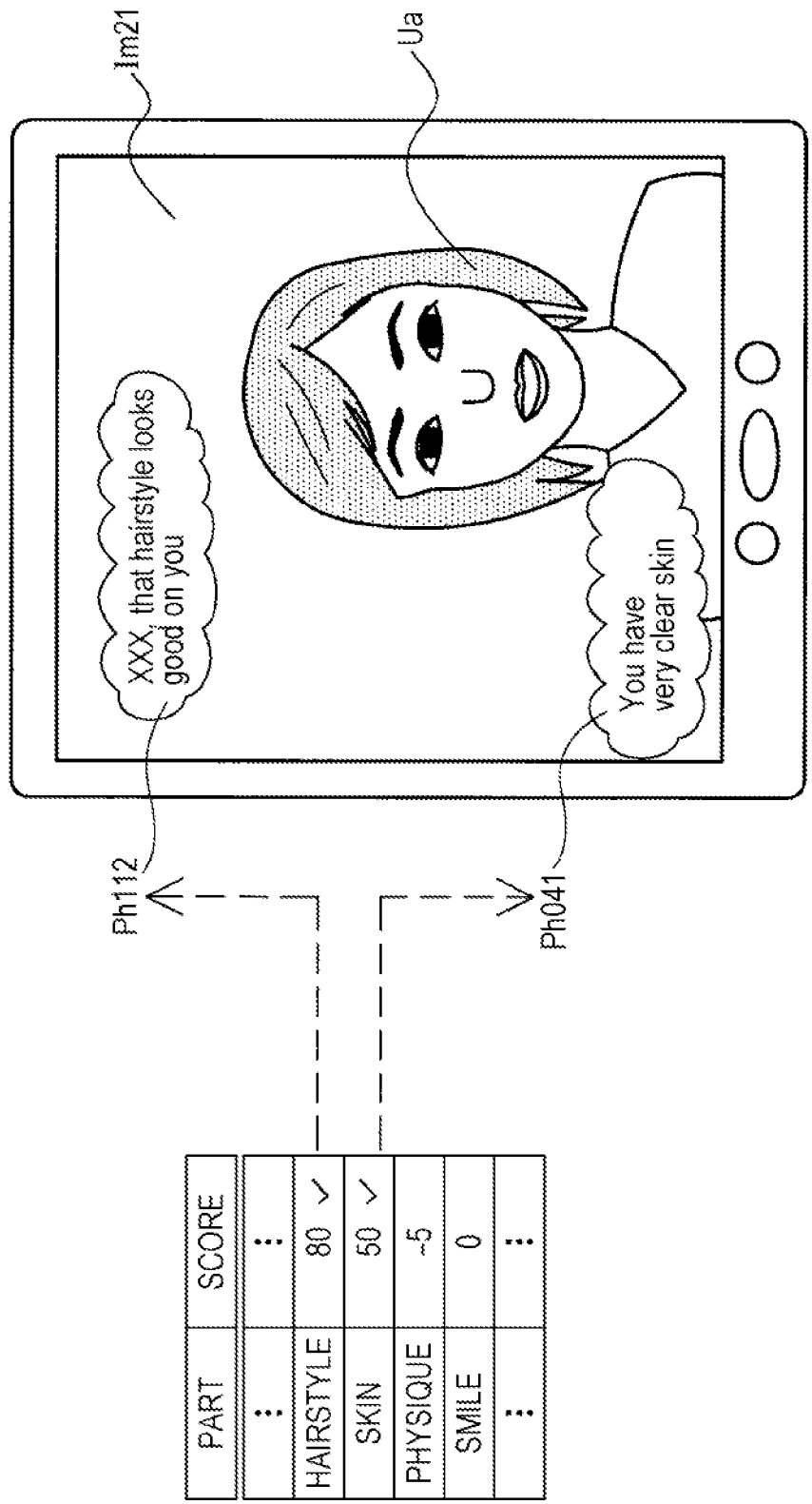
FIG. 9 is a diagram explaining an exemplary phrase output screen that may be displayed in a first embodiment.

FIG. 9 is a diagram explaining an exemplary phrase output screen that may be displayed in the present embodiment. The left side of FIG. 9 illustrates scores obtained as a result of comparing the appearance model Md1 and the input image Im11 illustrated by way of example in FIG. 5A. The scores demonstrate that "Hairstyle" and "Skin" are specified as features in the appearance of the user Ua. The phrase Ph041 is one of the phrases classified in a category corresponding to "Skin" in the phrase DB 152. The phrase Ph112 is one of the phrases classified in a category corresponding to "Hairstyle" in the phrase DB 152. In this way, the phrase output unit 170 may output to the display an output image Im21 generated by superimposing phrases selected from the phrase DB 152 by the phrase selector 150 over the input image.

[2-3. Process Flow]

Figure 10:
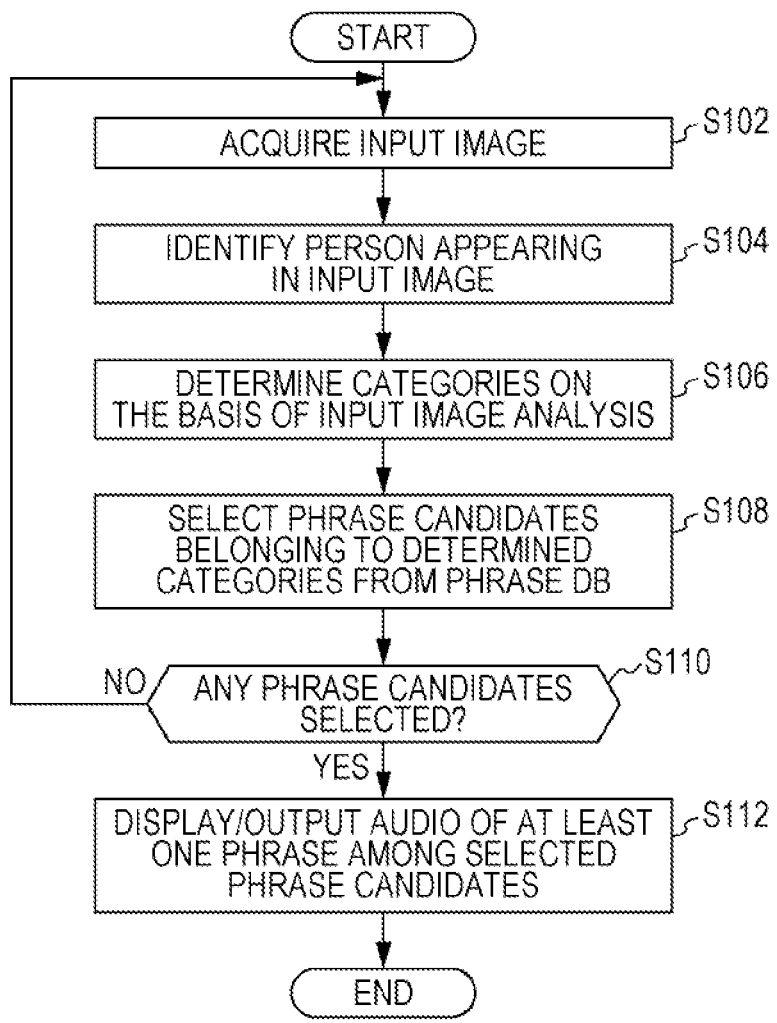
FIG. 10 is a flowchart illustrating exemplary flow of a phrase output process according to a first embodiment.

FIG. 10 is a flowchart illustrating exemplary flow of a phrase output process conducted by an information processing apparatus 100 according to the present embodiment.

As illustrated in FIG. 10, the image acquisition unit 120 first acquires a captured image generated by the imaging unit 102 as an input image (operation S102). The image acquisition unit 120 then outputs the acquired input image to the personal identification unit 130, the analyzer 140, and the user interface unit 160.

Next, the personal identification unit 130 identifies the person depicted in the input image acquired by the image acquisition unit 120 (operation S104). Then, the personal identification unit 130 outputs information specifying the identified person to the analyzer 140 and the phrase selector 150.

Next, the analyzer 140 analyzes the input image input from the image acquisition unit 120 and determines one or more categories from which to select phrase candidates on the basis of the analysis (operation S106). For example, the analyzer 140 may compare the appearance of the person depicted in the input image to an appearance model expressing the past appearance of the person identified by the personal identification unit 130, and specify features in the appearance of the person depicted in the input image. An appearance model expressing a standard appearance applied to multiple persons may also be used.

Next, from the phrase DB 152 the phrase selector 150 selects phrase candidates which belong to categories corresponding to features determined by the analyzer 140 (operation S108). At this point, the phrase selector 150 may also filter the phrase candidates to select according to the sex of the person determined by the analyzer 140 or scores regarding his or her appearance.

Next, the phrase output unit 170 determines whether or not any phrase candidates have been selected by the phrase selector 150 (operation S110). At this point, the process returns to operation S102 in the case where no phrase candidates have been selected. In contrast, the process proceeds to operation S112 in the case where one or more phrase candidates have been selected.

In operation S112, the phrase output unit 170 outputs, by display or audio via the user interface unit 160, at least one phrase from among the phrase candidates selected by the phrase selector 150 (operation S112).

[2-4. Summary of First Embodiment]

According to the first embodiment discussed above, the user of an information processing apparatus 100 is able to obtain a positive phrase regarding his or her appearance as feedback from the information processing apparatus 100 by pointing a camera at him- or herself and taking a picture. The positive phrase presented by the information processing apparatus 100 is a phrase related to a feature in the user's appearance, which has been determined by comparing the current image of the user with an appearance model. In other words, phrases are selectively presented to the user according to changes or differences in the user's appearance. Consequently, phrases can be selected and output so as to satisfy the psychological wants of a user who wants to receive acknowledgement of a change in his or her appearance.

[2-5. Modifications]

The phrase output unit 170 may also output phrases in accordance with the modifications described in this section in order to realize richer interaction with the user or to make the interaction more entertaining.

Figure 11:
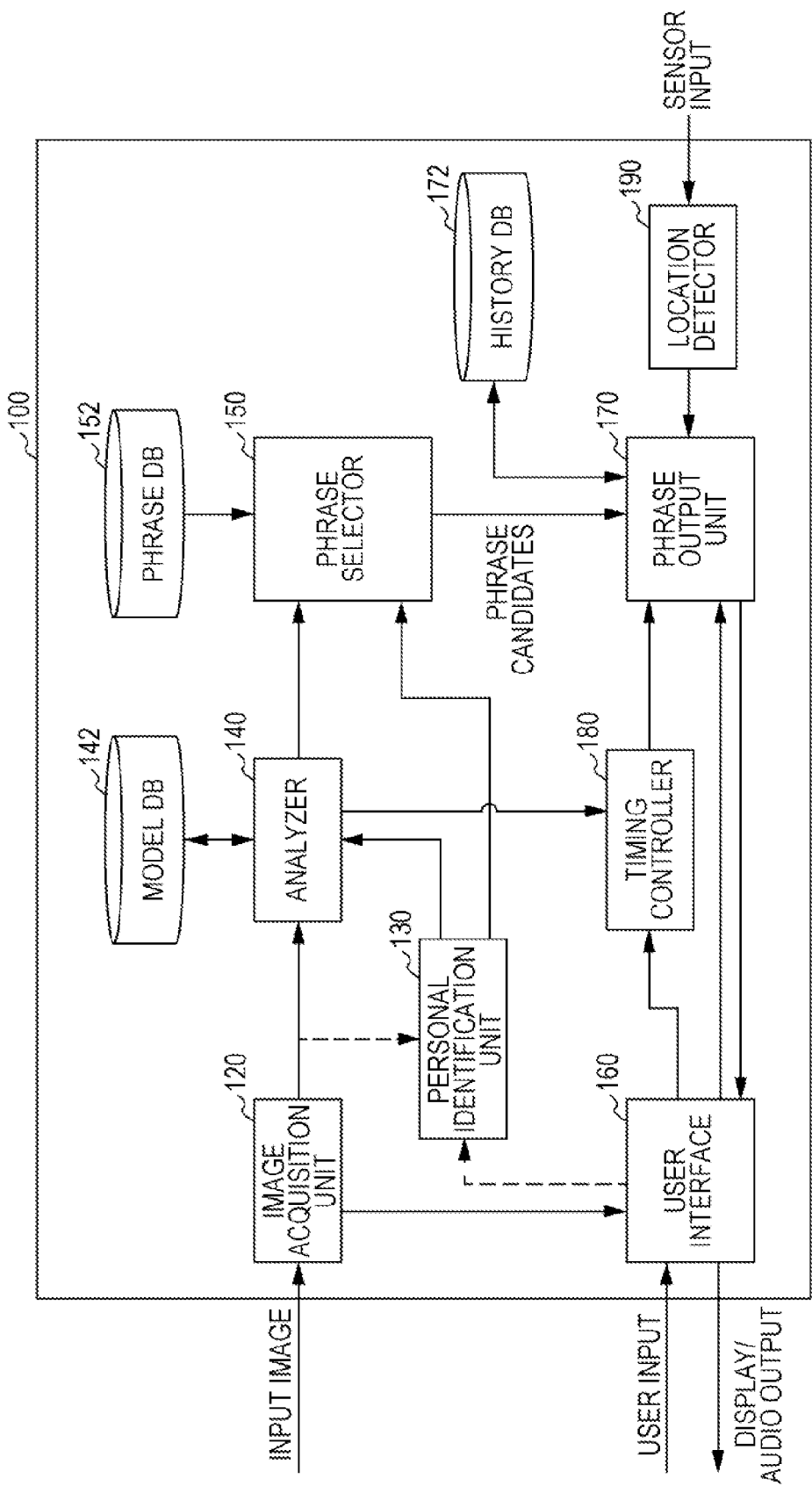
FIG. 11 is a block diagram illustrating an exemplary configuration of logical functions in an information processing apparatus according to a modification of the first embodiment.

FIG. 11 is a block diagram illustrating an exemplary configuration of logical functions in an information processing apparatus 100 according to a modification of the present embodiment. As illustrated in FIG. 11, the information processing apparatus 100 includes an image acquisition unit 120, a personal identification unit 130, an analyzer 140, a model DB 142, a phrase selector 150, a phrase DB 152, a user interface unit 160, a phrase output unit 170, a history DB 172, a timing controller 180, and a location detector 190.

(1) Timing Controller

The timing controller 180 controls the timings at which the phrase output unit 170 outputs phrases. For example, the timing controller 180 may cause the phrase output unit 170 to immediately output at least one phrase when a plurality of phrase candidates are selected by the phrase selector 150. Alternatively, the timing controller 180 may cause the phrase output unit 170 to output a phrase in the case of recognizing a specific expression, posture, or gesture made by the person depicted in an input image.

For example, the analyzer 140 may score the person depicted in an input image on his or her expression (such as a smile or wink, for example), posture, or gesture (such as a hand-waving gesture, for example). The timing controller 180 receives such scores from the analyzer 140, and may cause the phrase output unit 170 to output a positive phrase when a specific expression, posture, or gesture is recognized (such as when a score exceeds a given threshold value, for example). Thus, the user may exhibit a variety of expressions or gestures in order to elicit a positive phrase, which has a compound effect of making it easier to select effective phrases. Moreover, a game-like sense of fun may be added.

(2) Location Detector

The location detector 190 uses the sensor unit 104 illustrated in FIG. 3 to detect the location of the information processing apparatus 100. Furthermore, the phrase output unit 170 outputs different phrases according to the location of the information processing apparatus 100 detected by the location detector 190.

Phrases that differ depending on location may be phrases expressed in dialects particular to regions where the information processing apparatus 100 could be located, for example. In such cases, phrases with content corresponding to respective dialects are stored in advance in association with region data (such as data on the latitudes and longitudes of boundaries dividing regions, for example). Then, the phrase output unit 170 selectively outputs a phrase from among the phrase candidates that is associated with the location detected by the location detector 190. Alternatively, the phrase output unit 170 may generate a phrase expressed in a dialect by transforming given grammatical elements included in a phrase expressed in standard language into other grammatical elements expressing a dialect. In so doing, interaction with the user can be enriched.

3. DETAILS OF SECOND EMBODIMENT

Next, an information processing apparatus 200 according to the second embodiment illustrated in FIG. 2 will be described in detail.

[3-1. Hardware Configuration]

The hardware configuration of the information processing apparatus 200 may be similar to the hardware configuration of the information processing apparatus 100 illustrated in FIG. 3. However, the imaging unit of the information processing apparatus 200 is what is called a rear-facing camera, with its lens facing toward a person who communicates with the user of the information processing apparatus 200. Also, the information processing apparatus 200 is provided with a communication unit similar to the communication unit 114 in FIG. 3, and is able to communicate with other information processing apparatus. In one technique later described, phrases may be output from the information processing apparatus 200 via such a communication unit. The other information processing apparatus may be an apparatus possessed by the person who communicates with the user of the information processing apparatus 200, for example. Also, in another technique, the information processing apparatus 200 is provided with an audio output unit in the form of a directional speaker able to output audio having a particular directionality. Phrases may also be output from the information processing apparatus 200 via such audio output.

[3-2. Functional Configuration]

Figure 12:
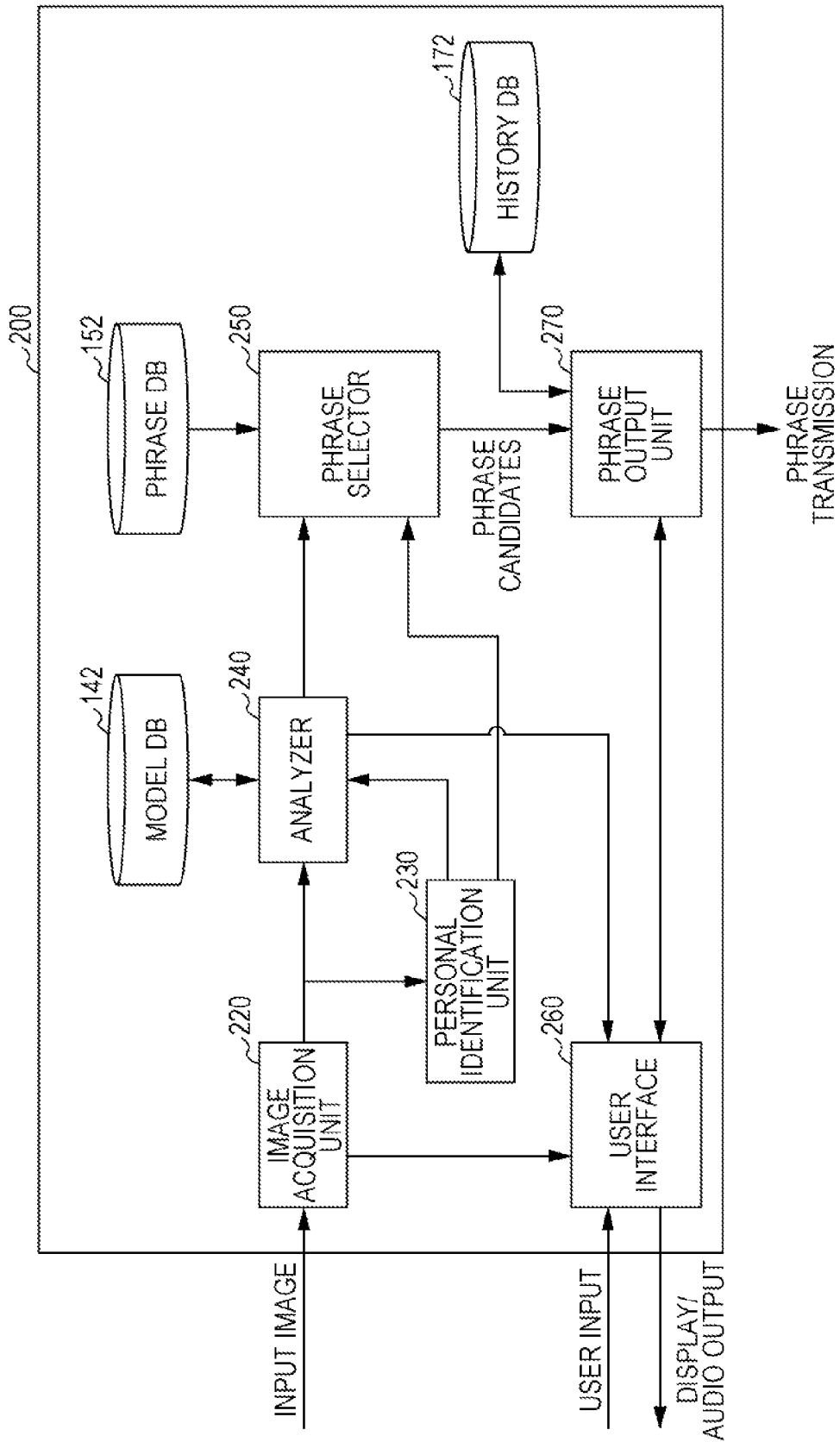
FIG. 12 is a block diagram illustrating an exemplary configuration of logical functions in an information processing apparatus according to a second embodiment.

FIG. 12 is a block diagram illustrating an exemplary configuration of logical functions realized by the storage and the controller of the information processing apparatus 200. As illustrated in FIG. 12, the information processing apparatus 200 includes an image acquisition unit 220, a personal identification unit 230, an analyzer 240, a model DB 142, a phrase selector 250, a phrase DB 152, a user interface unit 260, a phrase output unit 270, and a history DB 172.

(1) Image Acquisition Unit

The image acquisition unit 220 acquires a captured image capturing a person who communicates with the user of the information processing apparatus 200 as an input image. The image acquisition unit 220 then outputs the acquired input image to the personal identification unit 230, the analyzer 240, and the user interface unit 260. The input image acquired by the image acquisition unit 220 may be a still image, or an individual frame constituting part of a motion image.

(2) Personal Identification Unit

The personal identification unit 230 identifies a person depicted in an input image acquired by the image acquisition unit 220. The personal identification unit 230 may identify a person depicted in an input image by using a personal identification algorithm based on established image recognition technology, for example. The personal identification unit 230 may also respectively identify a plurality of persons in the case where a plurality of persons is depicted in an input image. The personal identification unit 230 outputs information specifying an identified person to the analyzer 240 and the phrase selector 250.

(3) Analyzer

The analyzer 240 analyzes an input image input from the image acquisition unit 220 in order to determine categories used when selecting phrase candidates from the phrase DB 152. Similarly to the analyzer 140 according to the first embodiment, the analyzer 240 analyzes an input image to specify features in the appearance of a person depicted in the input image. The appearance model compared against the appearance of a person depicted in an input image during such analysis may be a model of the past appearance of a person identified by the personal identification unit 230, or a model of a standard appearance.

Also, instead of specifying features in the appearance of a person depicted in an input image on the basis of input image analysis, the analyzer 240 may specify features by prompting the user to specify one or more parts of that person's appearance. The specification of features via a user interface will be further described later.

(4) Phrase Selector

The phrase selector 250 selects phrase candidates to present to a person depicted in an input image. Phrase candidates are selected from the phrase DB 152, which stores a plurality of positive phrases. In the present embodiment, the phrase DB 152 likewise stores phrases in separate categories regarding a person's appearance, as discussed earlier. Similarly to the phrase selector 150 according to the first embodiment, the phrase selector 250 selects phrases which belong to categories corresponding to features in the appearance of a particular person as phrase candidates. Features in the appearance of a particular person may be specified on the basis of input image analysis or specified by the user. The phrase selector 250 then outputs the selected phrase candidates to the phrase output unit 270. Meanwhile, in the case where a plurality of persons are depicted in an input image, the phrase selector 250 generates a different list of phrase candidates for each person identified by the personal identification unit 230, and outputs these lists to the phrase output unit 270.

(5) User Interface Unit

The user interface unit 260 presents a user interface to the user of the information processing apparatus 200. For example, the user interface unit 260 may present to the user an input screen prompting the user to input identification information for identifying a person depicted in an input image. The user interface unit 260 may also present to the user a configuration screen for setting an appearance model to be used when analyzing an input image with the analyzer 240, from, for example, one or more selectable appearance models.

Figure 13:
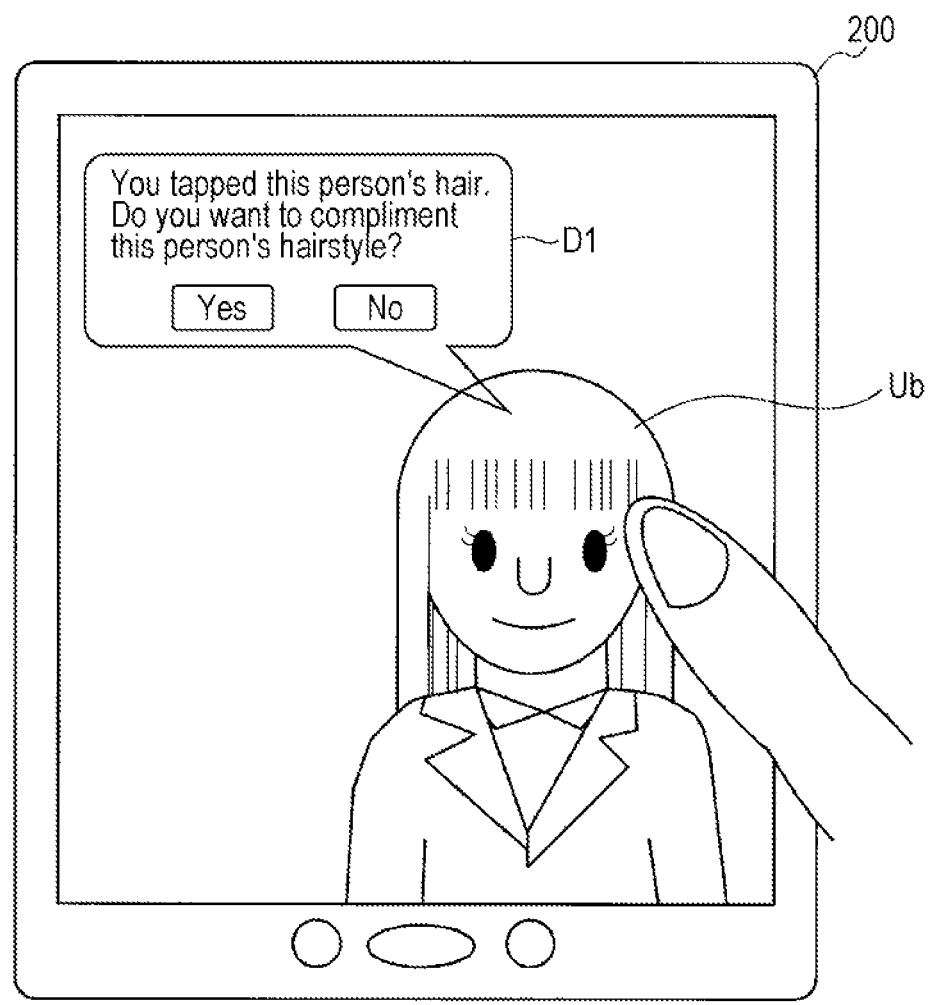
FIG. 13 is a diagram explaining specification of features via a user interface.

The user interface unit 260 may also present to the user a feature specification screen prompting the user to specify features of a person depicted in an input image. As an example, FIG. 13 illustrates the user of the information processing apparatus 200 specifying a feature of a person depicted in an input image. As illustrated in FIG. 13, the user of the information processing apparatus 200 is touching the hair of a person Ub displayed by the information processing apparatus 200. As a result, "Hairstyle" is specified as a feature. In FIG. 13, a dialog D1 asking for confirmation of "Hairstyle" being specified as a feature is displayed on-screen. By enabling the user to specify features in this way, the information processing apparatus 200 is able to effectively support a user who finds it difficult to think of suitable words to say, even though the user has noticed something to compliment in a person with whom the user communicates.

Figure 14:
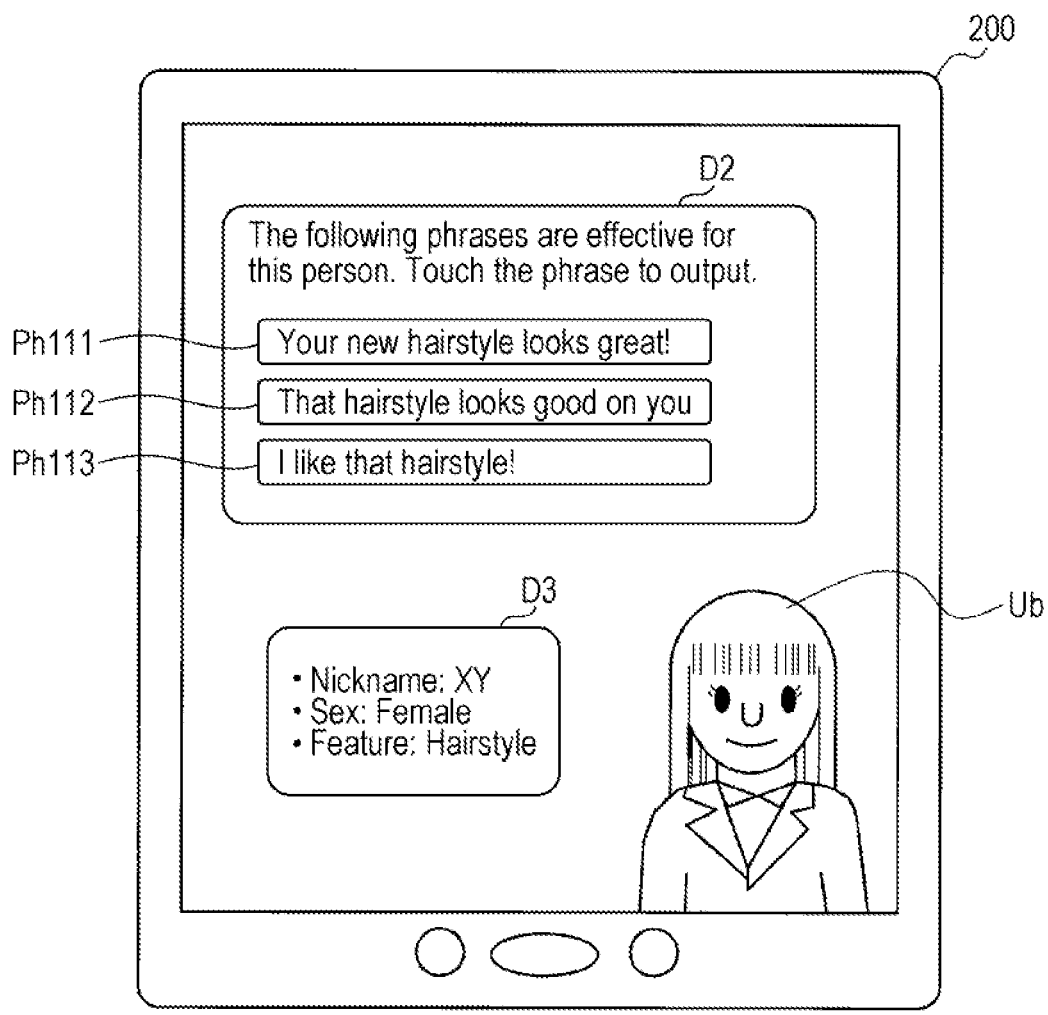
FIG. 14 is a diagram explaining specification of an output phrase via a user interface.

The user interface unit 260 may also present to the user a user interface for prompting the user to specify a phrase to be output by the phrase output unit 270. The user interface is typically an output phrase specification screen that prompts the user to specify a desired phrase from among phrase candidates selected by the phrase selector 250. FIG. 14 illustrates an exemplary output phrase specification screen. As illustrated in FIG. 14, a dialog D2 displays three phrase candidates Ph111, Ph112, and Ph113 which have been selected by the phrase selector 250 for a person Ub depicted in an input image. These three phrase candidates are all phrases for complimenting the hairstyle of the person Ub. Additionally, a dialog D3 indicating the nickname, sex, and feature of the person Ub is also displayed on the same screen. The dialog D2 prompts the user of the information processing apparatus 200 to tap a desired phrase for output. If the user subsequently taps one of the phrases, the tapped phrase may be output by the phrase output unit 270. By providing such an output phrase specification screen, the information processing apparatus 200 is able to support the user in the selection of effective phrases while also deferring to the user the decision of which phrase to ultimately output.

(6) Phrase Output Unit

The phrase output unit 270 outputs at least one phrase from among phrase candidates selected by the phrase selector 250. In the present embodiment, a phrase may be output by being displayed or output as audio via the user interface unit 260, or by being transmitted to another information processing apparatus.

Figure 15:
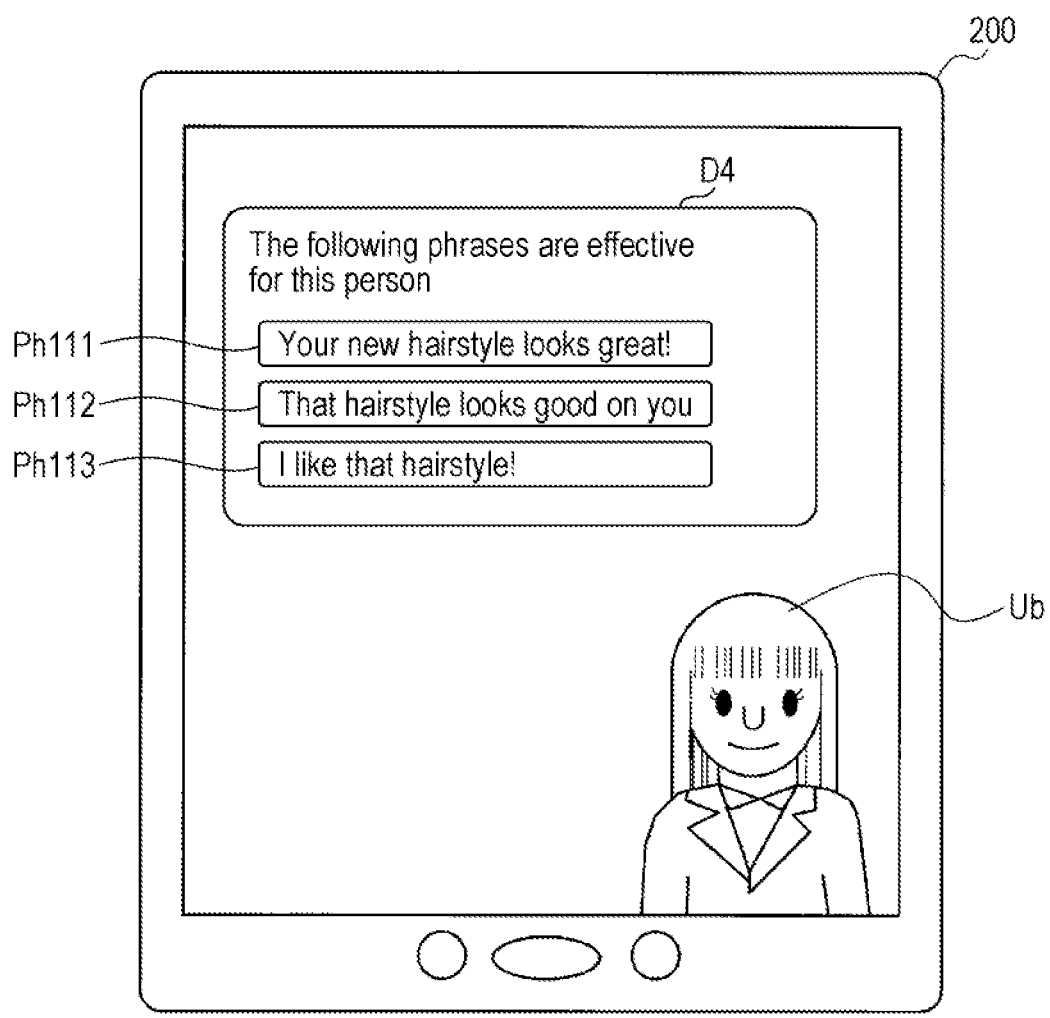
FIG. 15 is a diagram explaining display of phrases via a user interface.

FIG. 15 illustrates an exemplary phrase display screen which may be presented by the user interface unit 260 in the present embodiment. As illustrated in FIG. 15, a dialog D4 displays three phrase candidates Ph111, Ph112, and Ph113 which have been selected by the phrase selector 250 for a person Ub depicted in an input image. These three phrase candidates are all phrases for complimenting the hairstyle of the person Ub. The user of the information processing apparatus 200 is able to refer to such a phrase display screen and personally use a phrase thought to be optimal for communication with the person Ub (such as by speaking the phrase or inputting the phrase in a chat or messaging service, for example). In other words, in this case, the information processing apparatus 200 supports user communication by outputting a screen for selecting an effective phrase used to compliment someone.

The phrase output unit 270 may also output audio of at least one phrase from among phrase candidates selected by the phrase selector 250. In this case, if the information processing apparatus 200 includes a directional speaker, the phrase output unit 270 may also output directional audio directed toward a particular person identified by image analysis. Thus, in cases where a plurality of persons are depicted in an input image, effective phrases corresponding to respective persons can be output without being mixed up by the individuals in the plurality.

The phrase output unit 270 may also output at least one phrase to another information processing apparatus via a communication unit. As discussed earlier, the other information processing apparatus may be an apparatus possessed by a person who communicates with the user of the information processing apparatus 200. For example, the phrase output unit 270 may activate an email client or an instant messaging (IM) client, and transmit an email or an instant message stating at least one phrase to an apparatus possessed by a person who communicates with the user of the information processing apparatus 200. In this case, email accounts or IM accounts associated with respective persons identified by the personal identification unit 230 may be used as the destinations of such emails or instant messages.

Figure 16:
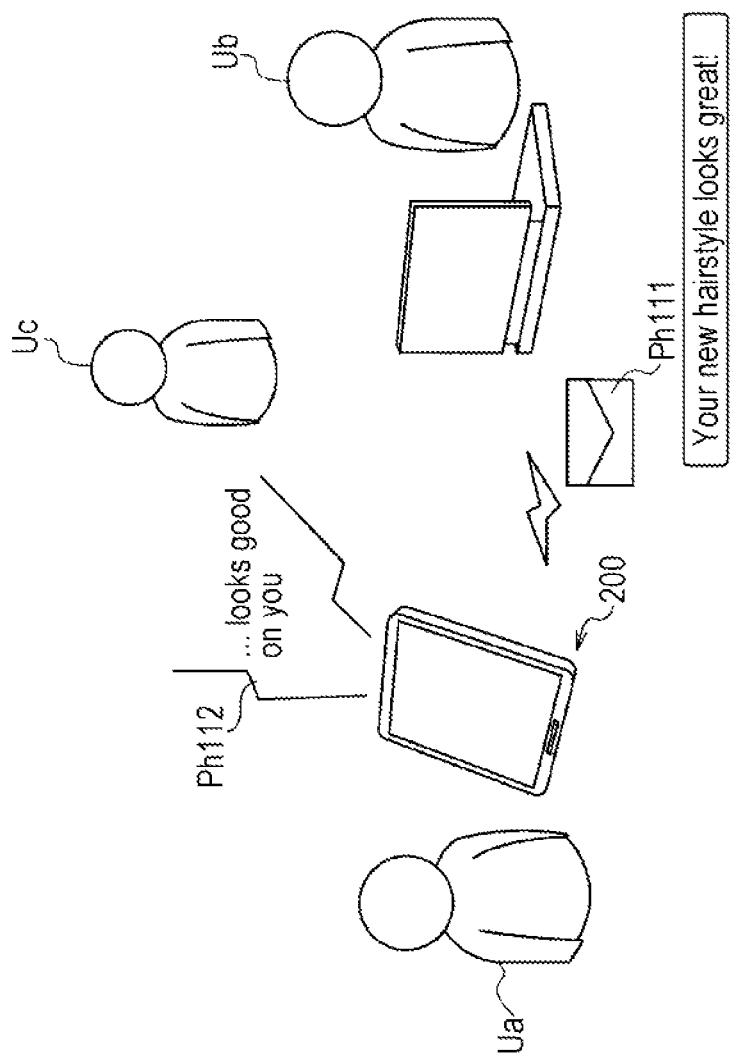
FIG. 16 is a diagram explaining output of different phrases for different people.

Also, in the case where a plurality of persons are depicted in an input image, the phrase output unit 270 may output a different phrase for each person even if the same phrase candidates have been selected for the plurality of persons. FIG. 16 is a diagram explaining output of different phrases for different people. FIG. 16 illustrates the user Ua of the information processing apparatus 200, as well as persons Ub and Uc who communicate with the user Ua. Herein, assume that "Hairstyle" is a feature of both persons Ub and Uc. In this case, the information processing apparatus 200 may output a phrase Ph111 to the person Ub and a phrase Ph112 to the person Uc, for example. In the example in FIG. 16, the phrase Ph111 is output by email, while the phrase Ph112 is output as audio. By outputting different phrases for different people in this way, it is possible to avoid negative impacts on communication due to duplicate usage of the same phrase. Furthermore, when determining a phrase to output, the phrase output unit 270 may prioritize combinations of phrases and persons with high scores computed by the analyzer 240.

[3-3. Process Flow]

Figure 17:
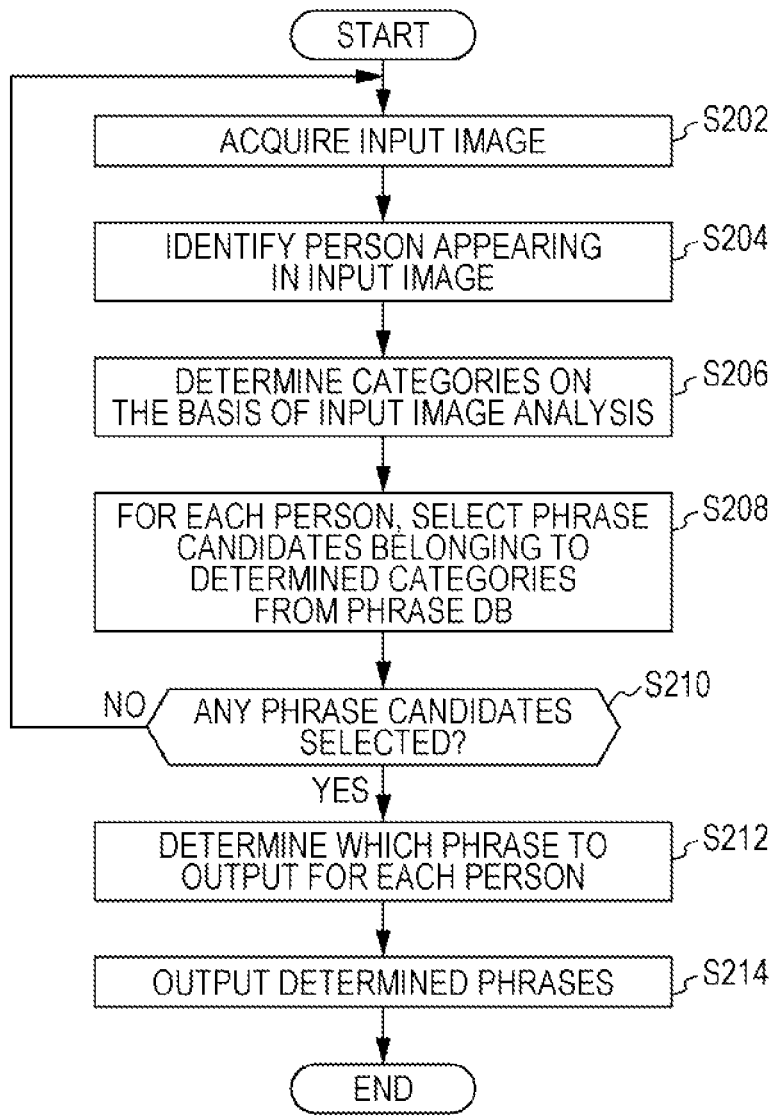
FIG. 17 is a flowchart illustrating exemplary flow of a phrase output process according to a second embodiment.

FIG. 17 is a flowchart illustrating exemplary flow of a phrase output process conducted by an information processing apparatus 200 according to the present embodiment.

As illustrated in FIG. 17, the image acquisition unit 220 first acquires a captured image generated by the imaging unit 202 as an input image (operation S202). The image acquisition unit 220 then outputs an acquired input image to the personal identification unit 230, the analyzer 240, and the user interface unit 260.

Next, the personal identification unit 230 identifies the person depicted in the input image acquired by the image acquisition unit 220 (operation S204). Then, the individual identification unit 230 outputs information specifying the identified individual to the analyzer 240 and the phrase selector 250.

Next, the analyzer 240 analyzes the input image input from the image acquisition unit 220 and on the basis thereof determines one or more categories from which to select phrase candidates for each person depicted in the input image (operation S206).

Next, from the phrase DB 152 the phrase selector 250 selects, for each person, phrase candidates which belong to categories corresponding to features determined by the analyzer 240 (operation S208).

Next, the phrase output unit 270 determines whether or not any phrase candidates have been selected by the phrase selector 250 (operation S210). At this point, the process returns to operation S202 in the case where no phrase candidates have been selected. In contrast, the process proceeds to operation S212 in the case where one or more phrase candidates have been selected.

In operation S212, the phrase output unit 270 determines which phrase to output for each person (operation S212). For example, the phrase output unit 270 may determine a phrase to output for each person such that a different phrase is output for each person. The phrase output unit 270 may also refer to the history DB 172 and avoid repeating output of the same phrase to the same person. Also, in the case where a phrase display screen like that illustrated in FIG. 15 is presented, the phrase output unit 270 may determine to output all phrase candidates selected by the phrase selector 250 on-screen.

Subsequently, the phrase output unit 270 causes the determined phrases to be displayed on-screen, output as audio, or transmitted via the communication unit (operation S214).

[3-4. Summary of Second Embodiment]

According to the second embodiment discussed above, the user of an information processing apparatus 200 is able to capture an image of one or more persons with whom the user communicates, and thereby cause the information processing apparatus 200 to output positive phrases regarding the appearance of the one or more persons. Consequently, the information processing apparatus 200 supports the user in the selection of suitable phrases important for interpersonal communication. Also, a phrase output in the present embodiment is a phrase regarding a feature in a person's appearance, which has been determined by comparing an image of a person who communicates with the user against an appearance model. Although accurately discerning a person's features is typically not easy, in the present embodiment the features of a person who communicates with the user may be determined by the information processing apparatus 200. Thus, the burden of discerning features is reduced for the user of the information processing apparatus 200.

[3-5. Modifications]

In the present embodiment, various modifications are likewise possible in order to realize richer interpersonal communication or to make communication more entertaining.

Figure 18:
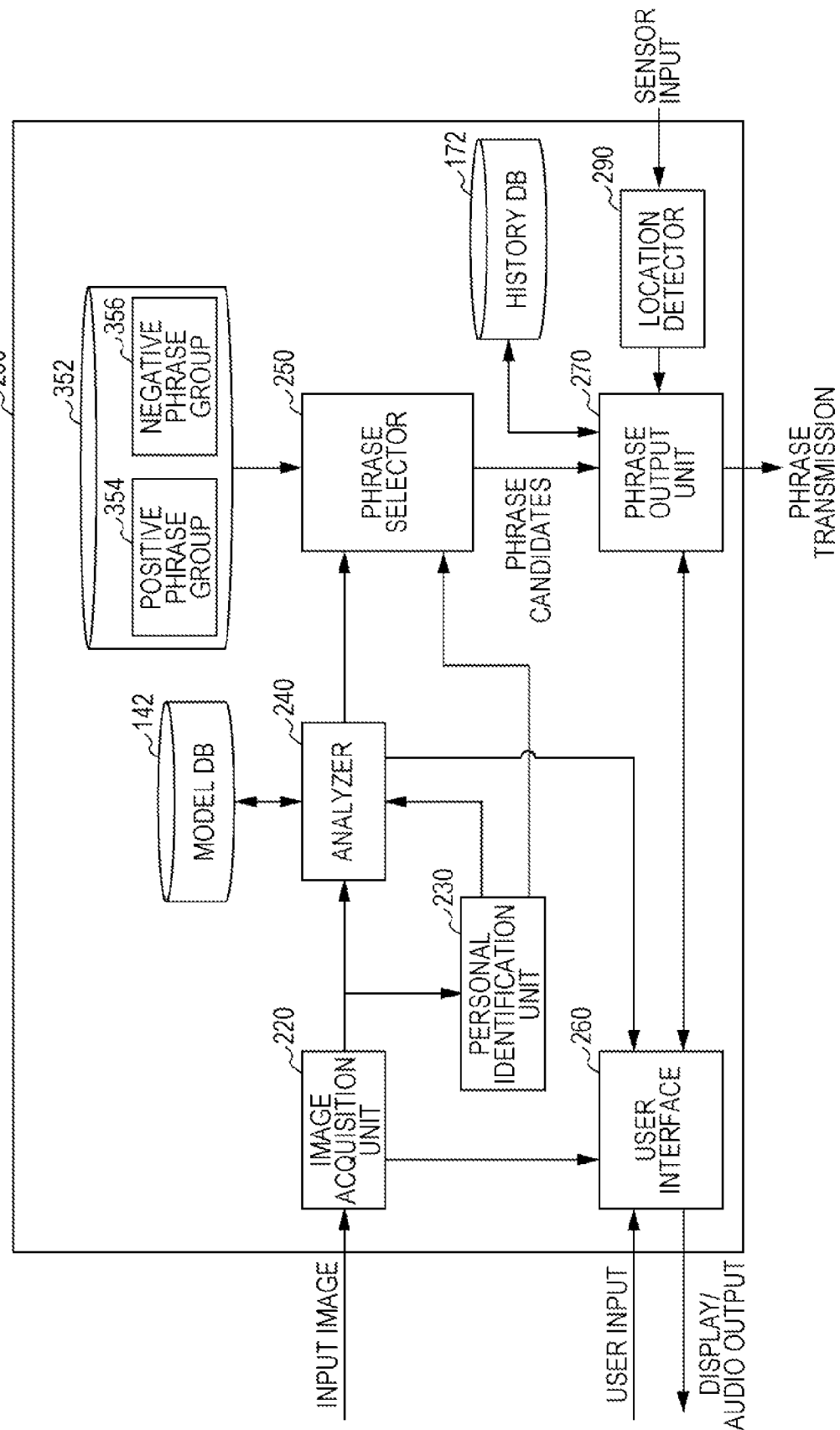
FIG. 18 is a block diagram illustrating an exemplary configuration of logical functions in an information processing apparatus according to a modification of the second embodiment.

FIG. 18 is a block diagram illustrating an exemplary configuration of logical functions in an information processing apparatus 200 according to a modification of the present embodiment. As illustrated in FIG. 18, the information processing apparatus 200 includes an image acquisition unit 220, a personal identification unit 230, an analyzer 240, a model DB 142, a phrase selector 250, a phrase DB 352, a user interface unit 260, a phrase output unit 270, a history DB 172, and a location detector 290.

(1) Location Detector

The location detector 290 uses sensors similar to those of the sensor unit 104 illustrated in FIG. 3 to detect the location of the information processing apparatus 200. Furthermore, the phrase output unit 270 outputs different phrases according to the location of the information processing apparatus 200 detected by the location detector 290.

Phrases that differ depending on location may be phrases expressed in dialects as discussed earlier. Also, phrases that differ depending on location may be phrases expressed in formal language and phrases expressed in casual language. Phrases expressed in formal language and phrases expressed in casual language may be stored in advance in the phrase DB 352, for example. The phrase output unit 270 may then selectively output formal phrases from among the phrase candidates if the detected location (as a result of cross-referencing with available map data, for example) is determined to be a public place such as an office. In contrast, the phrase output unit 270 may selectively output casual phrases from among the phrase candidates if the detected location is determined to not be a public place. In so doing, suitable phrases can be output to match the user's circumstances.

(2) Negative Phrase Group

As illustrated in FIG. 18, the phrase DB 352 stores a positive phrase group 354 and a negative phrase group 356. The positive phrase group 354 is a set of positive phrases like those illustrated by way of example in FIG. 7. In contrast, the negative phrase group 356 is a set of phrases expressing negative content, while still having a data structure similar to that of the phrase DB 152 illustrated by way of example in FIG. 7. If the user issues instructions to output positive phrases (or in other words, if a "Compliment mode" is indicated), for example, the phrase selector 250 selects phrase candidates to present to a person depicted in an input image from the positive phrase group 354. In contrast, if the user issues instructions to output negative phrases (or in other words, if an "Insult mode" is indicated), the phrase selector 250 selects phrase candidates to present to a person depicted in an input image from the negative phrase group 356. If negative phrase candidates are selected by the phrase selector 250, the phrase output unit 270 outputs at least one negative phrase from among the phrase candidates according to one of the techniques discussed earlier. Typically, it is not easy to select words for insulting a person one is communicating with, even if the intention is to insult that person. However, in the present modification, the information processing apparatus 200 may additionally provide support in the selection of such negative phrases, thus making it possible to effectively insult a person one is communicating with. Such a system may be used in an application where users insult each other for fun as a game, for example.

4. CONCLUSION

The foregoing describes two embodiments and modifications thereof, in detail and with the use of FIGS. 1 to 18. According to the foregoing embodiments, positive phrases to present to a person depicted in an input image are selected as phrase candidates from a database, and at least one phrase from among the phrase candidates is output. Consequently, it is possible to dynamically select effective phrases for communication with other people on the basis of recognition of real-world conditions. In the case where such dynamically selected phrases are presented to the user, it is possible to increase that user's motivation in his or her daily life and work. In the case where such dynamically selected phrases are utilized in communication between the user and other people, it is possible to support the selection of phrases during such communication and reduce the user's burden, and facilitate smooth communication.

Meanwhile, the series of operations conducted by the apparatus described in this specification is typically realized in software. Programs constituting software that realizes a series of operations may be stored in advance in a storage medium provided internally or externally to the apparatus, for example. The programs may then be loaded into random access memory (RAM) and executed by a processor at runtime.

The foregoing thus describes preferred embodiments of the present disclosure in detail and with reference to the attached drawings. However, the technical scope of the present disclosure is not limited to such examples. It is to be understood as obvious by persons ordinarily skilled in the art that various modifications or alterations may occur while remaining within the domain of the technical ideas described in the claims, and that such modifications or alterations naturally belong to the technical scope of the present disclosure.

Furthermore, configurations like the following also belong to the technical scope of the present disclosure.

(1). An information processing system comprising:
one or more processors configured so as to:
receive an input image captured by an image sensor;
analyze the input image to identify a difference in appearance between a subject depicted in the input image and a model subject;
select one or more phrases from a plurality of phrase candidates based on the identified difference in appearance between the subject and a model subject; and,
output, to an output device, at least one of the one or more selected phrases for presentment to a recipient.

(2). The information processing system of (1), wherein the one or more processors are further configured to identify the difference in appearance between the subject depicted in the input image and the model subject by comparing one or more features of the subject extracted from the analysis of the input image with one or more predetermined features of the model subject.

(3). The information processing system of (1), wherein the one or more processors are further configured to
select the one or more phrases from the plurality of phrase candidates based on a determined category of the identified difference in appearance between the subject depicted in the input image and the model subject.

(4). The information processing system of (1), wherein the one or more processors are further configured to select the model subject based on a prior image or images of the subject depicted in the input image.

(5). The information processing system of (1), wherein the one or more processors are further configured to select the model subject based on an image or images of one or more average subjects, the one or more average subjects being different from the subject depicted in the input image.

(6). The information processing system of (1), wherein the one or more processors are further configured to:
display the input image depicting the subject to a user on a display device;
determine a feature of the subject selected by the user; and,
display, on the display device, one or more phrase candidates from the plurality of phrase candidates for further selection by the user, the one or more phrase candidates being displayed for further selection by the user based on the feature of the subject selected by the user.

(7). The information processing system of (1), wherein the one or more processors are further configured to exclude a given phrase from the one or more phrases selected from the plurality of phrase candidates, the given phrase being excluded based upon a determination by the one or more processors that the given phrase was previously or recently output to the output device for presentment to the recipient.

(8). The information processing system of (1), wherein the one or more processors are further configured to control a timing of the output of the at least one of the one or more selected phrases to the output device based on a condition of the subject determined from the analysis of the input image.

(9). The information processing system of (8), wherein the condition of the subject determined from the analysis of the input image includes a specific expression, posture, or gesture of the subject depicted in the input image.

(10). The information processing system of (1), wherein the one or more processors are further configured to output the at least one of the one or more selected phrases to the output device based on a determined location of the subject depicted in the input image.

(11). The information processing system of (10), wherein the one or more processors are further configured to output the at least one of the one or more selected phrases to the output device using a particular dialect associated with the determined location.

(12). The information processing system of (1), wherein the at least one of the one or more selected phrases output to the output device is a complimentary or positive phrase that is selected from the plurality of phrase candidates based on the identified difference in appearance between the subject depicted in the input image and the model subject.

(13). The information processing system of (1), wherein the one or more processors are further configured to determine a degree of the identified difference in appearance between the subject and a model subject.

(14). The information processing system of (13), wherein the one or more processors are further configured to select the one or more phrases from the plurality of phrase candidates when the determined degree of the identified difference in appearance between the subject and a model subject exceeds a predetermined threshold.

(15). The information processing system of (1), wherein the model subject is selected from one of a plurality of selectable model subjects based on input received from a user.

(16). The information processing system of (1), wherein the one or more processors are configured to output audio of the at least one of the one or more selected phrases to the output device for presentment to the recipient.

(17). The information processing system of (16), wherein the output device is a directional speaker for directing the audio of the at least one of the one or more selected phrases in a determined direction of the recipient.

(18). The information processing system of (1), wherein the output device is part of an information processing device associated with the recipient.

(19). A computer-implemented method comprising:
receiving an input image captured by an image sensor;
analyzing, with a processor, the input image to identify a difference in appearance between a subject depicted in the input image and a model subject;
selecting one or more phrases from a plurality of phrase candidates based on the identified difference in appearance between the subject and a model subject; and,
outputting, to an output device, at least one of the one or more selected phrases for presentment to a recipient.

(20). A non-transitory storage unit on which computer-readable instructions of a program are stored, the instructions, when executed by one or more processors, causing the one or more processors to:
receive an input image captured by an image sensor;
analyze the input image to identify a difference in appearance between a subject depicted in the input image and a model subject;
select one or more phrases from a plurality of phrase candidates based on the identified difference in appearance between the subject and a model subject; and,
output, to an output device, at least one of the one or more selected phrases for presentment to a recipient.

What is claimed is:

1. An information processing system comprising:
one or more processors configured to:
receive an input image captured by an image sensor;
analyze the input image to identify a difference between one or more physical appearance features of a subject depicted in the input image and one or more corresponding physical appearance features of a model subject;
select one or more phrases from a plurality of phrase candidates based on the identified difference between the one or more physical appearance features of the subject and the one or more corresponding physical appearance features of the model subject;
detect a location of the information processing system; and
output, to an output device, at least one of the one or more selected phrases using a particular dialect associated with the detected location, wherein the particular dialect is in formal language of the particular dialect in an event the detected location corresponds to a public space in a reference map data.

2. The information processing system of claim 1, wherein the one or more processors are further configured to identify the difference between the subject depicted in the input image and the model subject by comparing the one or more physical appearance features of the subject extracted from the analysis of the input image with one or more predetermined physical appearance features of the model subject.

3. The information processing system of claim 1, wherein the one or more processors are further configured to select the one or more phrases from the plurality of phrase candidates based on a determined category of the identified difference between the one or more physical appearance features of the subject depicted in the input image and the one or more corresponding physical appearance features of the model subject.

4. The information processing system of claim 1, wherein the one or more processors are further configured to select the model subject based on a prior image or images of the subject depicted in the input image.

5. The information processing system of claim 1, wherein the one or more processors are further configured to select the model subject based on an image or images of one or more average subjects, the one or more average subjects being different from the subject depicted in the input image.

6. The information processing system of claim 1, wherein the one or more processors are further configured to:
display the input image depicting the subject to a user on a display device;
determine a physical appearance feature of the subject selected by the user; and
display, on the display device, one or more phrase candidates from the plurality of phrase candidates for further selection by the user, the one or more phrase candidates being displayed for further selection by the user based on the physical appearance feature of the subject selected by the user.

7. The information processing system of claim 1, wherein the one or more processors are further configured to exclude a given phrase from the one or more phrases selected from the plurality of phrase candidates, the given phrase being excluded based upon a determination by the one or more processors that the given phrase was previously or recently output to the output device.

8. The information processing system of claim 1, wherein the one or more processors are further configured to control a timing of the output of the at least one of the one or more selected phrases to the output device based on a condition of the subject determined from the analysis of the input image.

9. The information processing system of claim 8, wherein the condition of the subject determined from the analysis of the input image includes a specific expression, posture, or gesture of the subject depicted in the input image.

10. The information processing system of claim 1, wherein the one or more processors are further configured to determine a degree of the identified difference between the one or more physical appearance features of the subject and the one or more corresponding physical appearance features of the model subject.

11. The information processing system of claim 10, wherein the one or more processors are further configured to select the one or more phrases from the plurality of phrase candidates when the determined degree of the identified difference exceeds a predetermined threshold.

12. The information processing system of claim 1, wherein the model subject is selected from one of a plurality of selectable model subjects based on input received from a user.

13. The information processing system of claim 1, wherein the one or more processors are configured to output audio of the at least one of the one or more selected phrases to the output device.

14. A method comprising:
in an information processing apparatus:
receiving an input image captured by an image sensor;
analyzing, with a processor, the input image to identify a difference between one or more physical appearance features of a subject depicted in the input image and one or more corresponding physical appearance features of a model subject;

selecting one or more phrases from a plurality of phrase candidates based on the identified difference between the one or more physical appearance features of the subject and the one or more corresponding physical appearance features of the model subject;

detecting a location of the information processing apparatus; and outputting, to an output device, at least one of the one or more selected phrases using a particular dialect associated with the detected location, wherein the particular dialect is in formal language of the particular dialect in an event the detected location corresponds to a public space in a reference map data.

15. A non-transitory computer-readable storage medium having computer-executable instructions stored thereon that, when executed by one or more processors of an information processing apparatus, cause the one or more processors to:

receive an input image captured by an image sensor;

analyze the input image to identify a difference between one or more physical appearance features of a subject depicted in the input image and one or more corresponding physical appearance features of a model subject;

select one or more phrases from a plurality of phrase candidates based on the identified difference between the one or more physical appearance features of the subject and the one or more corresponding physical appearance features of the model subject;

detect a location of the information processing apparatus; and output, to an output device, at least one of the one or more selected phrases using a particular dialect associated with the detected location, wherein the particular dialect is in formal language of the particular dialect in an event the detected location corresponds to a public space in a reference map data.

16. The information processing system of claim 1, wherein the one or more physical appearance features comprise one or more facial features of the subject.

17. The information processing system of claim 16, wherein the one or more physical appearance features comprise one or more body parts of the subject or an expression of the subject.

18. The information processing system of claim 1, wherein the one or more physical appearance features comprise one or more of a hairstyle of the subject, clothing of the subject or accessories worn by the subject.

19. The information processing system of claim 1, wherein the one or more processors are configured to identify the difference between one or more demographic attributes of the subject depicted in the input image and one or more corresponding demographic attributes of the model subject.

20. The information processing system of claim 19, wherein the one or more attributes comprise gender of the subject or age group of the subject.

21. The information processing system of claim 19, wherein the one or more processors are configured to select the one or more phrases based on a difference between a combination of the one or more physical appearance features and the one or more demographic attributes of the subject and a combination of the one or more corresponding physical appearance features and the one or more corresponding demographic attributes of the model subject.

22. An information processing apparatus comprising:

one or more processors configured to:

receive an input image from another information processing apparatus;

analyze the input image to identify a difference between one or more physical appearance features of a subject depicted in the input image and one or more corresponding physical appearance features of a model subject;

select one or more phrases from a plurality of phrase candidates based on the identified difference between the one or more physical appearance features of the subject and the one or more corresponding physical appearance features of the model subject;

detect a location of the information processing apparatus;

transmit the one or more selected phrases to the other information processing apparatus using a particular dialect associated with the detected location, wherein the particular dialect is in formal language of the particular dialect in an event the detected location corresponds to a public space in a reference map data.

* * * * *